(12) United States Patent
Manolakos et al.

(10) Patent No.: US 11,818,738 B2
(45) Date of Patent: Nov. 14, 2023

(54) ORTHOGONAL RANDOM ACCESS CHANNEL (RACH) PREAMBLE SEQUENCE FOR POSITIONING

(71) Applicant: QUALCOMM Incorporated, San Diego, CA (US)

(72) Inventors: Alexandros Manolakos, Escondido, CA (US); Mukesh Kumar, Dinanagar (IN); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/109,892

(22) Filed: Dec. 2, 2020

(65) Prior Publication Data
US 2022/0174656 A1 Jun. 2, 2022

(51) Int. Cl.
*H04W 72/51* (2023.01)
*H04W 48/10* (2009.01)
(Continued)

(52) U.S. Cl.
CPC ........... *H04W 72/51* (2023.01); *H04W 48/10* (2013.01); *H04W 72/542* (2023.01);
(Continued)

(58) Field of Classification Search
CPC . H04W 72/048; H04W 48/10; H04W 72/085; H04W 74/004; H04W 74/0833; H04W 74/002
See application file for complete search history.

(56) References Cited

U.S. PATENT DOCUMENTS

2020/0238175 A1* 7/2020 Smullen .................. G09G 5/397
2020/0281025 A1* 9/2020 Huang ................ H04W 74/006
(Continued)

FOREIGN PATENT DOCUMENTS

WO WO-2020146739 A1 7/2020

OTHER PUBLICATIONS

3GPP TS 38.213: "3rd Generation Partnership Project; Technical Specification Group Radio Access Network; NR; Physical Layer Procedures for Control (Release 15)", 3GPP Standard, Technical Specification, 3GPP TS 38.213, V15.6.0 (Jun. 2019), 3rd Generation Partnership Project (3GPP), Mobile Competence Centre, 650, Route Des Lucioles, F-06921 Sophia-Antipolis Cedex, France, vol. RAN WG1, No. V15.6.0, Jun. 24, 2019 (Jun. 24, 2019), pp. 1-107, XP051754327, [retrieved on Jun. 24, 2019] section 1 "Scope" section 8 "Random access procedure", Chapter 8. in particular table 8.1-1.
(Continued)

*Primary Examiner* — Walter J Divito
*Assistant Examiner* — Anthony Luo
(74) *Attorney, Agent, or Firm* — Muncy, Geissler, Olds & Lowe, P.C./Qualcomm

(57) ABSTRACT

Disclosed are techniques for wireless communication. In an aspect, a user equipment (UE) determines at least one random access channel (RACH) preamble from a first set of RACH preambles, wherein the first set of RACH preambles is for positioning purposes and a second set of RACH preambles is for communication purposes, and wherein the first set of RACH preambles and the second set of RACH preambles are associated with at least one transmission-reception point (TRP), transmits, to the at least one TRP, the at least one RACH preamble to indicate that the UE is involved in a positioning session, receives, from the at least one TRP, in response to transmitting the at least one RACH
(Continued)

preamble, an allocation of one or more resources for transmission of uplink positioning signals for the positioning session, and transmits the uplink positioning signals via the one or more resources.

64 Claims, 21 Drawing Sheets

(51) Int. Cl.
  *H04W 72/542* (2023.01)
  *H04W 74/00* (2009.01)
  *H04W 72/08* (2009.01)
  *H04W 74/08* (2009.01)
(52) U.S. Cl.
  CPC ..... *H04W 74/004* (2013.01); *H04W 74/0833* (2013.01); *H04W 74/002* (2013.01)

(56) References Cited

U.S. PATENT DOCUMENTS

| | | | |
|---|---|---|---|
| 2020/0367292 A1* | 11/2020 | Ren | H04W 74/002 |
| 2022/0110085 A1* | 4/2022 | Khoryaev | H04L 5/0051 |
| 2022/0110169 A1* | 4/2022 | Utkovski | H04W 74/0833 |
| 2022/0174727 A1* | 6/2022 | Yerramalli | H04W 76/27 |
| 2022/0225424 A1* | 7/2022 | Wang | H04L 43/0864 |

OTHER PUBLICATIONS

Intel Corporation: "NR Positioning Design Enhancements", 3GPP Draft, 3GPP TSG RAN WG1 #103-e, R1-2007946, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 17, 2020 (Oct. 17, 2020), XP051939974, 25 Pages, Retrieved from the Internet: URL: https://ftp.3gpp.org/tsg_ran/WG1_RL1/TSGR1_103-e/Docs/R1-2007946.zip R1-2007946 Intel—NR Pos_R17_Enhancements.docx [Retrieved on Oct. 17, 2020] Section 2.4.2.

Intel Corporation: "Potential Enhancements of NR Positioning Design," 3GPP Draft, 3GPP TSG RAN WG1 Meeting #102-E, R1-2005879, 3rd Generation Partnership Project (3GPP), Mobile Competence Centre, 650, Route Des Lucioles, F-06921, Sophia-Antipolis Cedex, France, vol. RAN WG1. No. e-Meeting, Aug. 17-Aug. 28, 2020, Aug. 8, 2020 (Aug. 8, 2020), XP051917781, 10 pages, Retrieved from the Internet: URL: https://ftp.3gpp.org/tsg_ran/WG1_RL1/TSGR1_102-e/Docs/R1-2005879.zip R1-2005879 Intel—NRP R17 Enhancements.docx [retrieved on Aug. 8, 2020] the whole document.

International Search Report and Written Opinion—PCT/US2021/071741—ISA/EPO—dated Jan. 21, 2022.

\* cited by examiner

ORTHOGONAL RANDOM ACCESS CHANNEL (RACH) PREAMBLE SEQUENCE FOR POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes determining at least one random access channel (RACH) preamble from a first set of RACH preambles, wherein the first set of RACH preambles is for positioning purposes and a second set of RACH preambles is for communication purposes, and wherein the first set of RACH preambles and the second set of RACH preambles are associated with at least one transmission-reception point (TRP); transmitting, to the at least one TRP, the at least one RACH preamble to indicate that the UE is involved in a positioning session; receiving, from the at least one TRP, in response to transmitting the at least one RACH preamble, an allocation of one or more resources for transmission of uplink positioning signals for the positioning session; and transmitting the uplink positioning signals via the one or more resources.

In an aspect, a method of wireless communication performed by a TRP includes transmitting an indication of at least one RACH preamble of a first set of RACH preambles, wherein the first set of RACH preambles is for positioning purposes and a second set of RACH preambles is for communication purposes, and wherein the first set of RACH preambles and the second set of RACH preambles are associated with the TRP; receiving, from a UE, the at least one RACH preamble from the first set of RACH preambles; and transmitting, to the UE, in response to receiving the at least one RACH preamble, an allocation of one or more resources for transmission of uplink positioning signals for a positioning session involving the UE.

In an aspect, a UE includes a memory; at least one transceiver; and at least one processor communicatively coupled to the memory and the at least one transceiver, the at least one processor configured to: determine at least one RACH preamble from a first set of RACH preambles, wherein the first set of RACH preambles is for positioning purposes and a second set of RACH preambles is for communication purposes, and wherein the first set of RACH preambles and the second set of RACH preambles are associated with at least one TRP; cause the at least one transceiver to transmit, to the at least one TRP, the at least one RACH preamble to indicate that the UE is involved in a positioning session; receive, from the at least one TRP, in response to transmitting the at least one RACH preamble, an allocation of one or more resources for transmission of uplink positioning signals for the positioning session; and cause the at least one transceiver to transmit the uplink positioning signals via the one or more resources.

In an aspect, a TRP includes a memory; at least one transceiver; and at least one processor communicatively coupled to the memory and the at least one transceiver, the at least one processor configured to: cause the at least one transceiver to transmit an indication of at least one RACH preamble of a first set of RACH preambles, wherein the first set of RACH preambles is for positioning purposes and a second set of RACH preambles is for communication purposes, and wherein the first set of RACH preambles and the second set of RACH preambles are associated with the TRP; receive, from a UE, the at least one RACH preamble from the first set of RACH preambles; and cause the at least one transceiver to transmit, to the UE, in response to receiving the at least one RACH preamble, an allocation of one or more resources for transmission of uplink positioning signals for a positioning session involving the UE.

In an aspect, a UE includes means for determining at least one RACH preamble from a first set of RACH preambles, wherein the first set of RACH preambles is for positioning purposes and a second set of RACH preambles is for communication purposes, and wherein the first set of RACH preambles and the second set of RACH preambles are associated with at least one TRP; means for transmitting, to the at least one TRP, the at least one RACH preamble to indicate that the UE is involved in a positioning session; means for receiving, from the at least one TRP, in response to transmitting the at least one RACH preamble, an allocation of one or more resources for transmission of uplink positioning signals for the positioning session; and means for transmitting the uplink positioning signals via the one or more resources.

In an aspect, a TRP includes means for transmitting an indication of at least one RACH preamble of a first set of RACH preambles, wherein the first set of RACH preambles is for positioning purposes and a second set of RACH preambles is for communication purposes, and wherein the first set of RACH preambles and the second set of RACH preambles are associated with the TRP; means for receiving, from a UE, the at least one RACH preamble from the first set of RACH preambles; and means for transmitting, to the UE, in response to receiving the at least one RACH preamble, an allocation of one or more resources for transmission of uplink positioning signals for a positioning session involving the UE.

In an aspect, a non-transitory computer-readable medium storing computer-executable instructions includes computer-executable instructions comprising: at least one instruction instructing a UE to determine at least one RACH preamble from a first set of RACH preambles, wherein the first set of RACH preambles is for positioning purposes and a second set of RACH preambles is for communication purposes, and wherein the first set of RACH preambles and the second set of RACH preambles are associated with at least one TRP; at least one instruction instructing the UE to transmit, to the at least one TRP, the at least one RACH preamble to indicate that the UE is involved in a positioning session; at least one instruction instructing the UE to receive, from the at least one TRP, in response to transmitting the at least one RACH preamble, an allocation of one or more resources for transmission of uplink positioning signals for the positioning session; and at least one instruction instructing the UE to transmit the uplink positioning signals via the one or more resources.

In an aspect, a non-transitory computer-readable medium storing computer-executable instructions includes computer-executable instructions comprising: at least one instruction instructing a TRP to transmit an indication of at least one RACH preamble of a first set of RACH preambles, wherein the first set of RACH preambles is for positioning purposes and a second set of RACH preambles is for communication purposes, and wherein the first set of RACH preambles and the second set of RACH preambles are associated with the TRP; at least one instruction instructing the TRP to receive, from a UE, the at least one RACH preamble from the first set of RACH preambles; and at least one instruction instructing the TRP to transmit, to the UE, in response to receiving the at least one RACH preamble, an allocation of one or more resources for transmission of uplink positioning signals for a positioning session involving the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
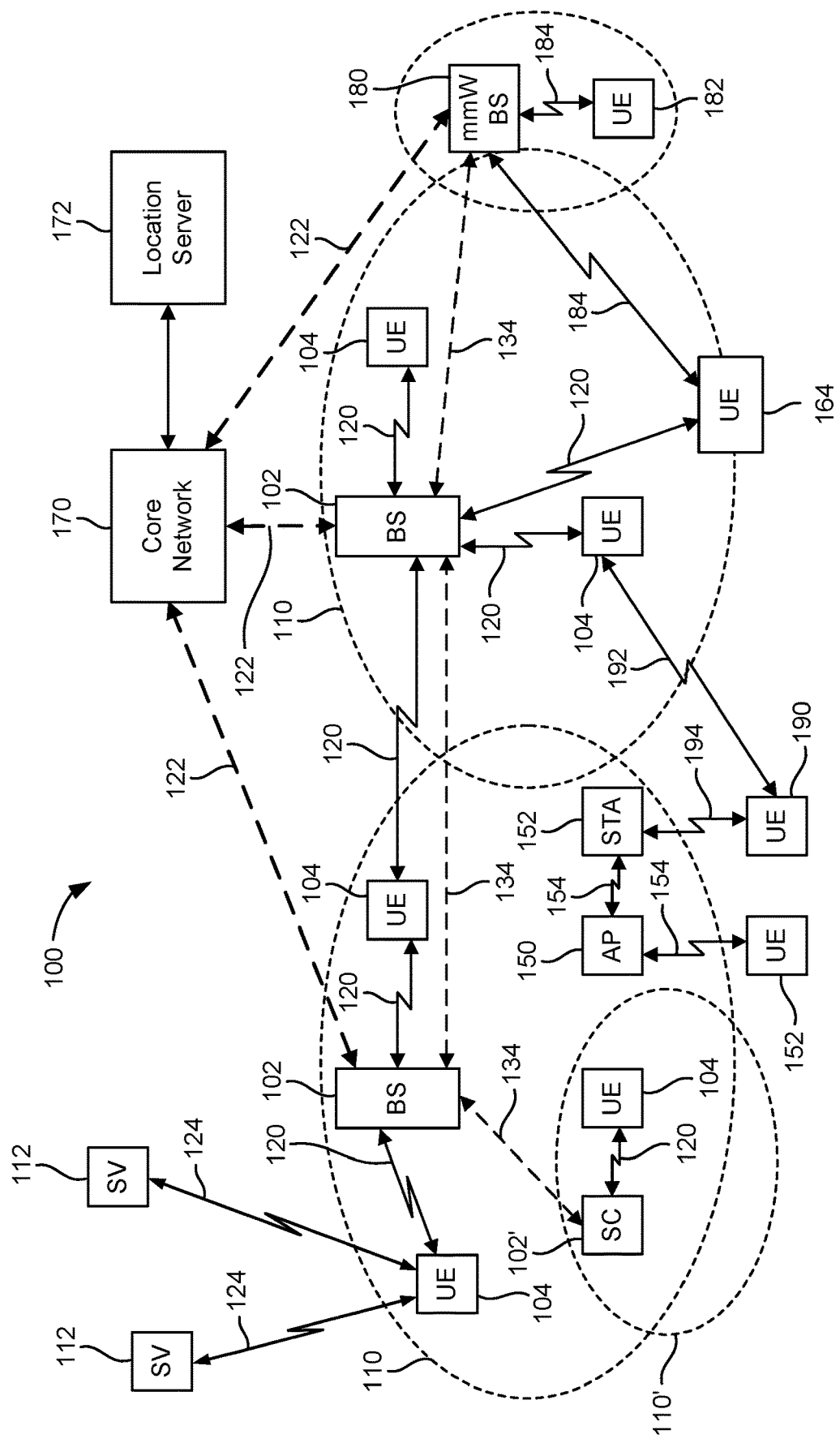
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110.

A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive signals for deriving geo location information from the SVs 112. An SPS typically includes a system of transmitters (e.g., SVs 112) positioned to enable receivers (e.g., UEs 104) to determine their location on or above the Earth based, at least in part, on signals received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
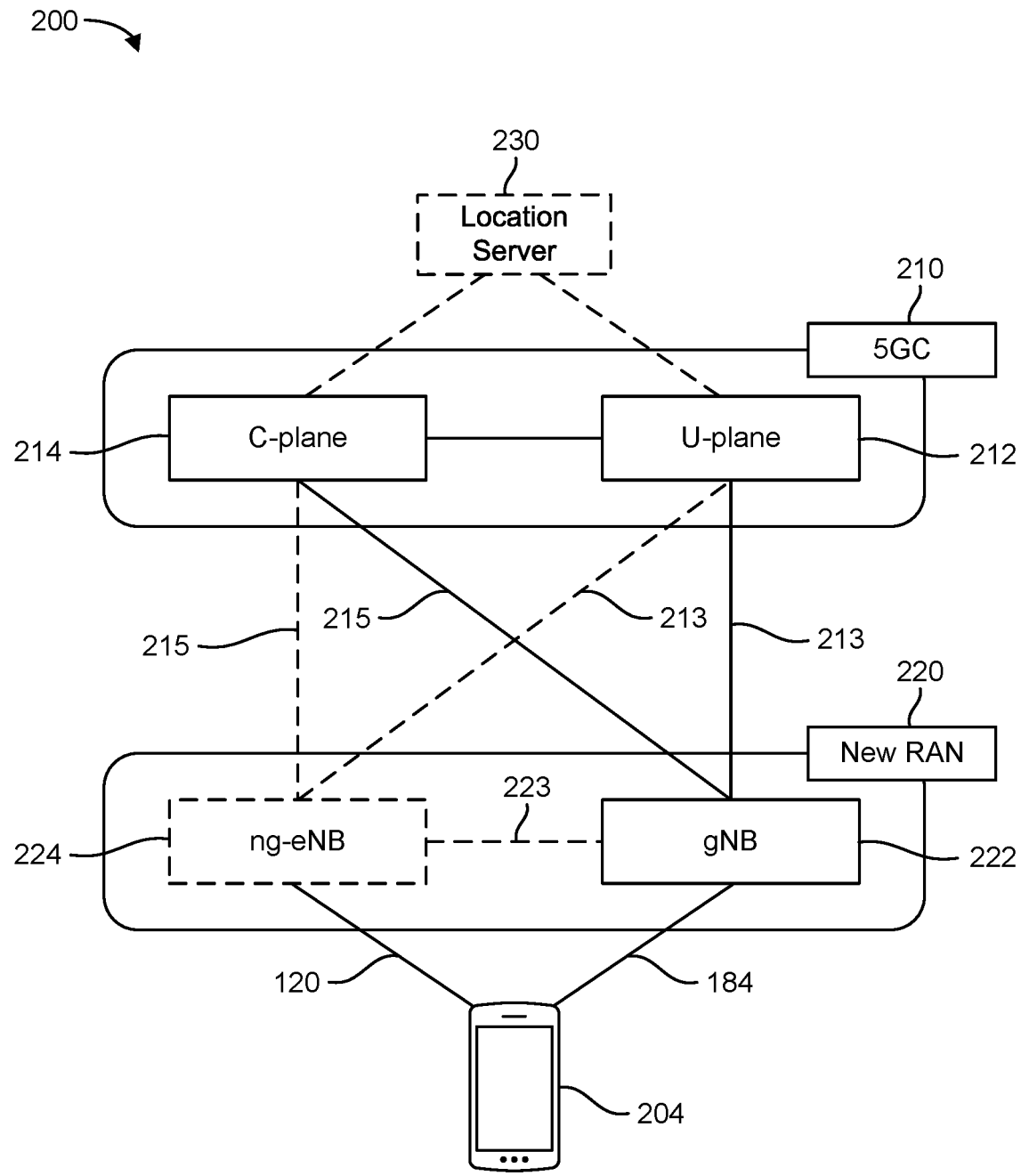
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
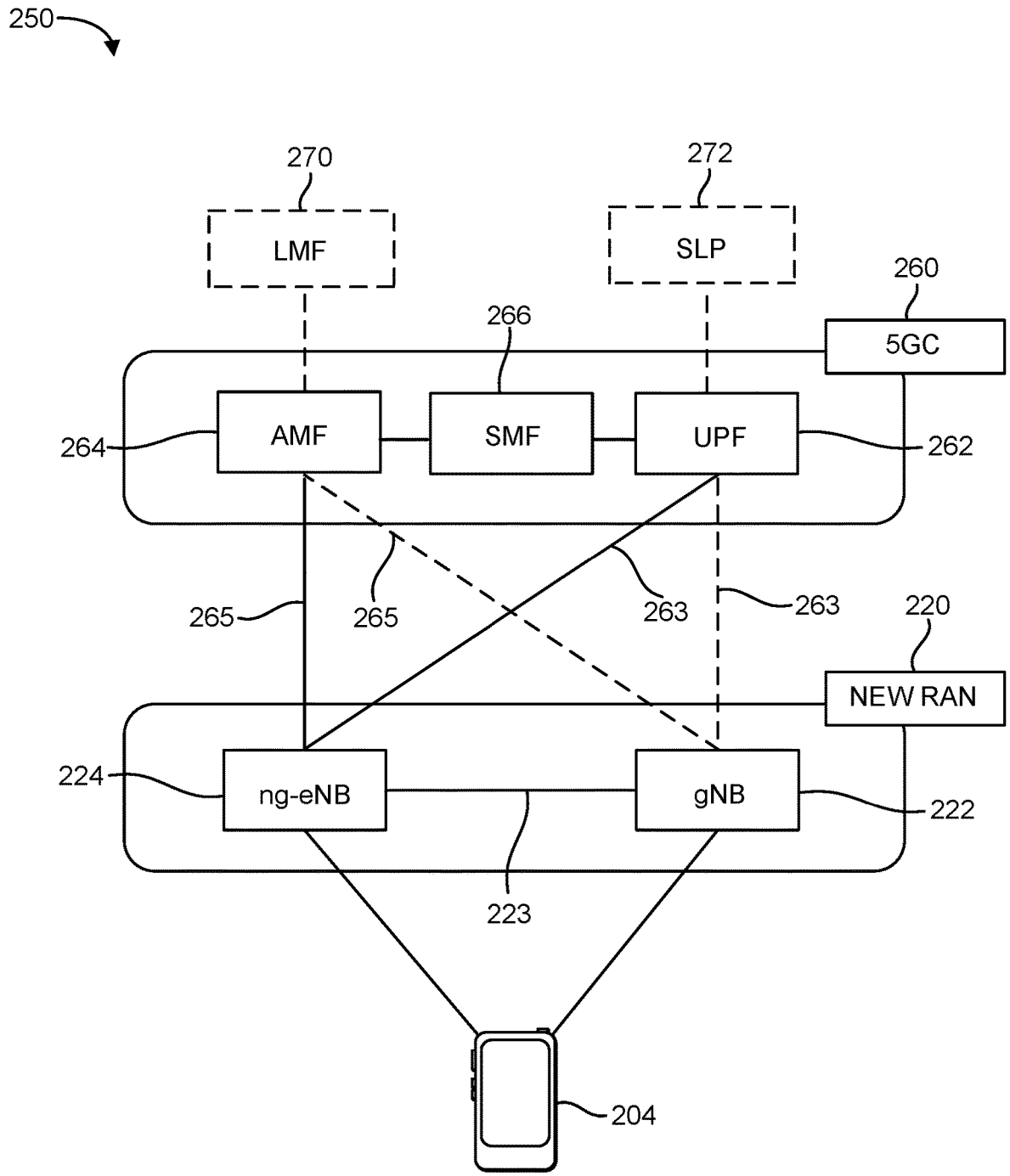

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 164 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 270 may communicate with UEs 204 and external clients (not shown in FIG. 2B) over a user plane (e.g., using protocols intended to carry voice and/or data like the transmission control protocol (TCP) and/or IP).

Figure 3A:
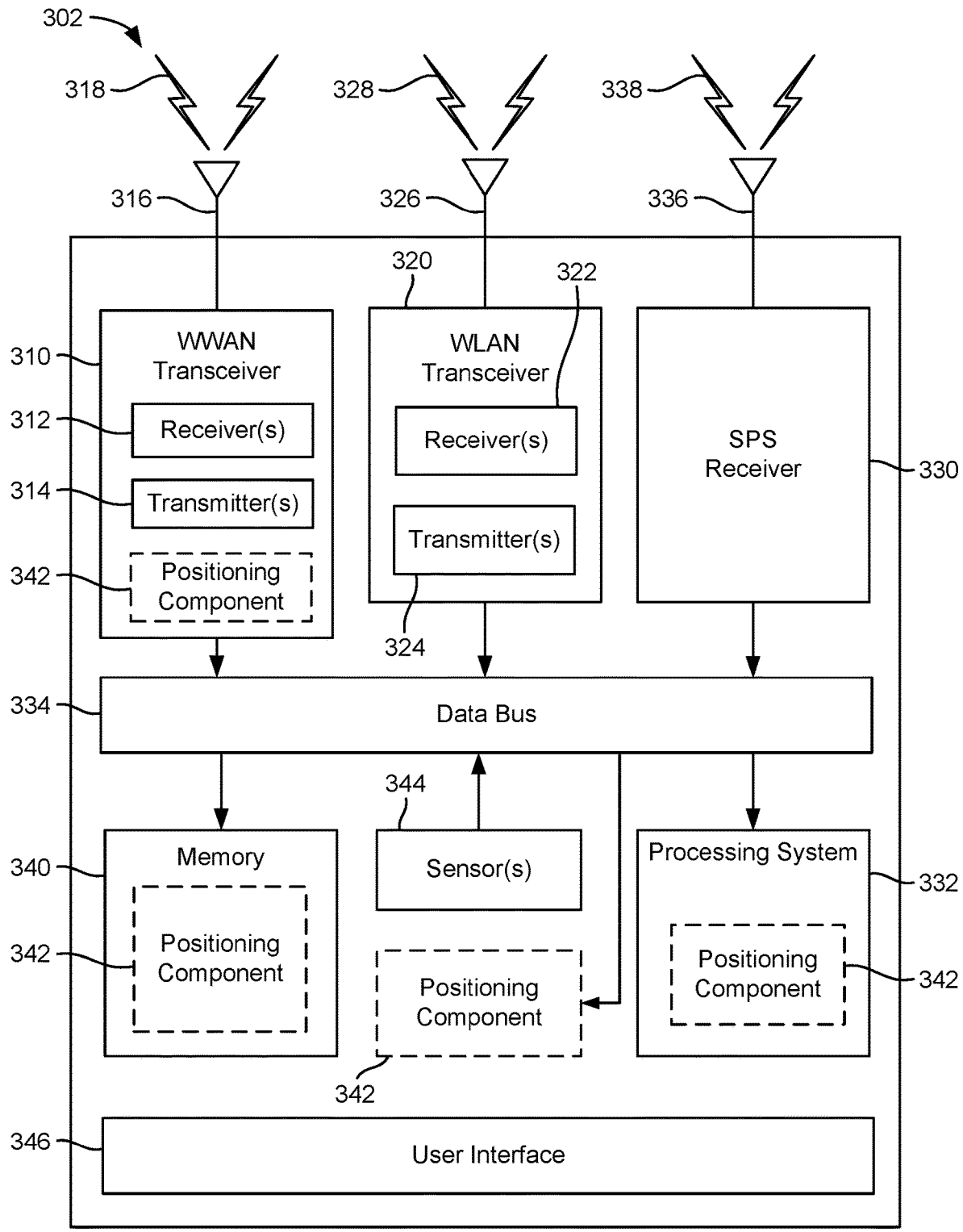
FIGS. 3A to 3C are simplified block diagrams of several sample aspects of components that may be employed in a user equipment (UE), a base station, and a network entity, respectively, and configured to support communications as taught herein.
Figure 3B:
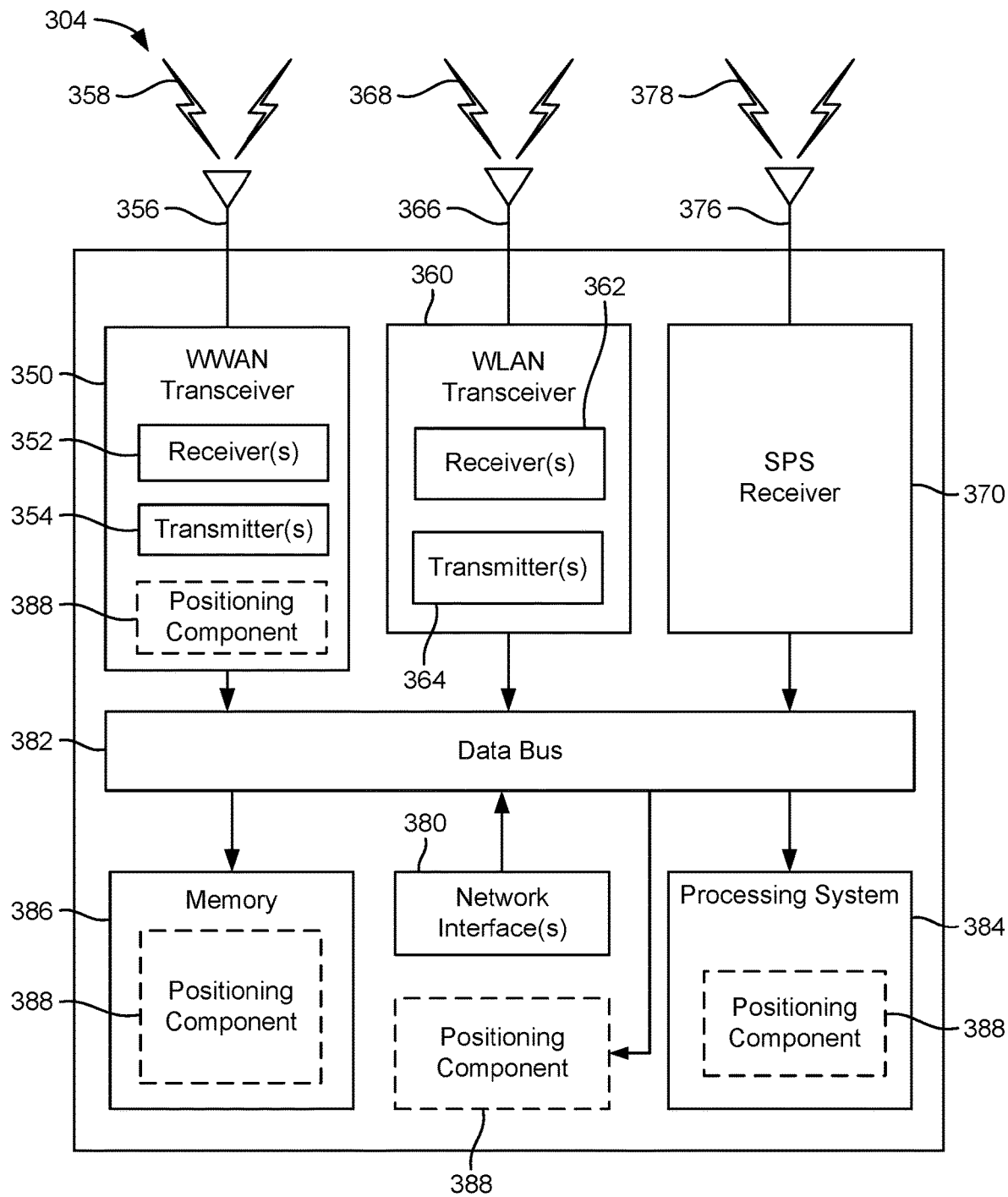
Figure 3C:
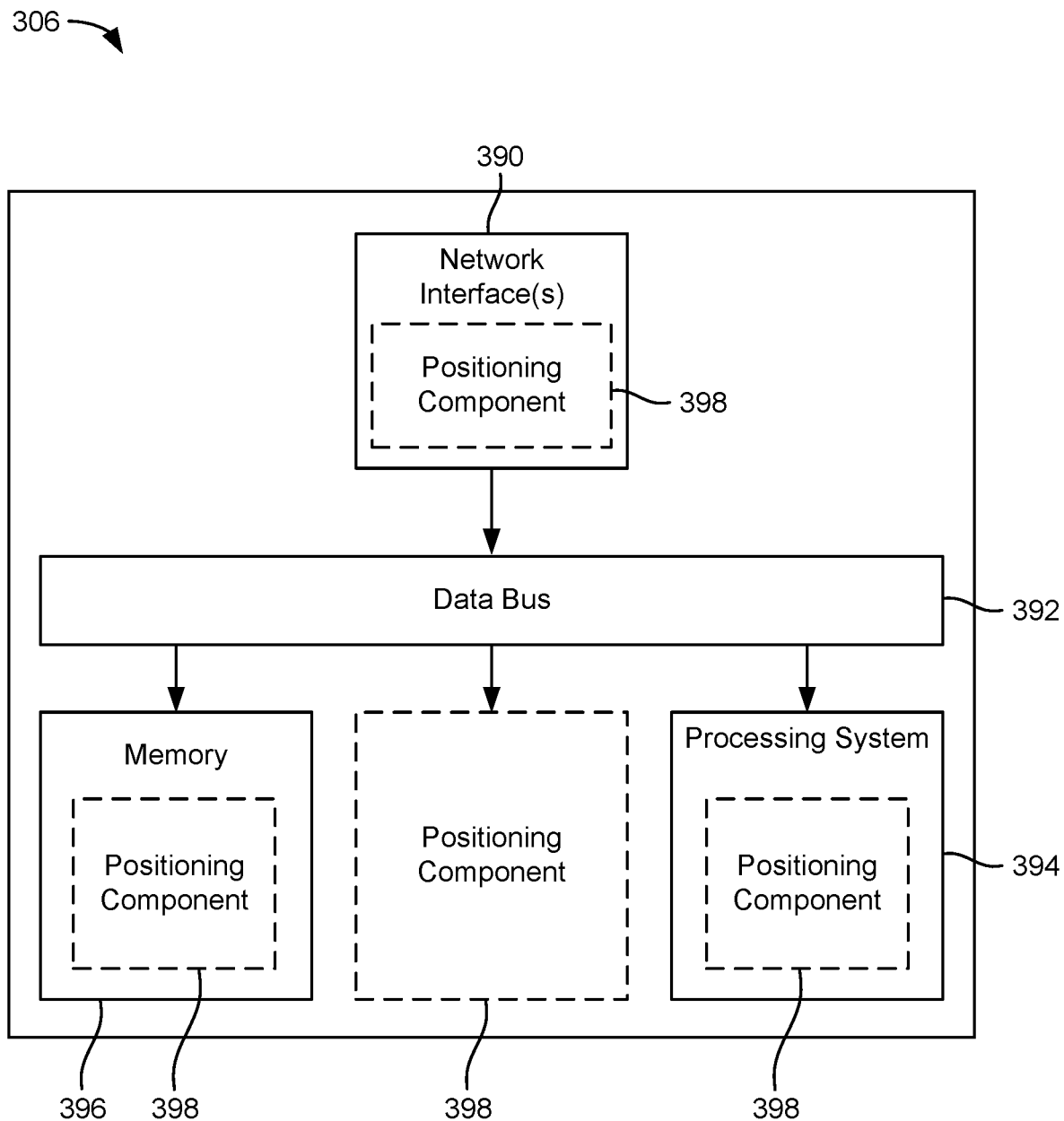

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include s 342, 388, and 398, respectively. The s 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the s 342, 388, and 398 may be external to the processing systems 332, 384, and 394 (e.g., part of a modem processing system, integrated with another processing system, etc.). Alternatively, the s 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the 342, which may be part of the WWAN transceiver 310, the memory component 340, the processing system 332, or any combination thereof, or may be a standalone component. FIG. 3B illustrates possible locations of the 388, which may be part of the WWAN transceiver 350, the memory component 386, the processing system 384, or any combination thereof, or may be a standalone component. FIG. 3C illustrates possible locations of the 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro- electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the s 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
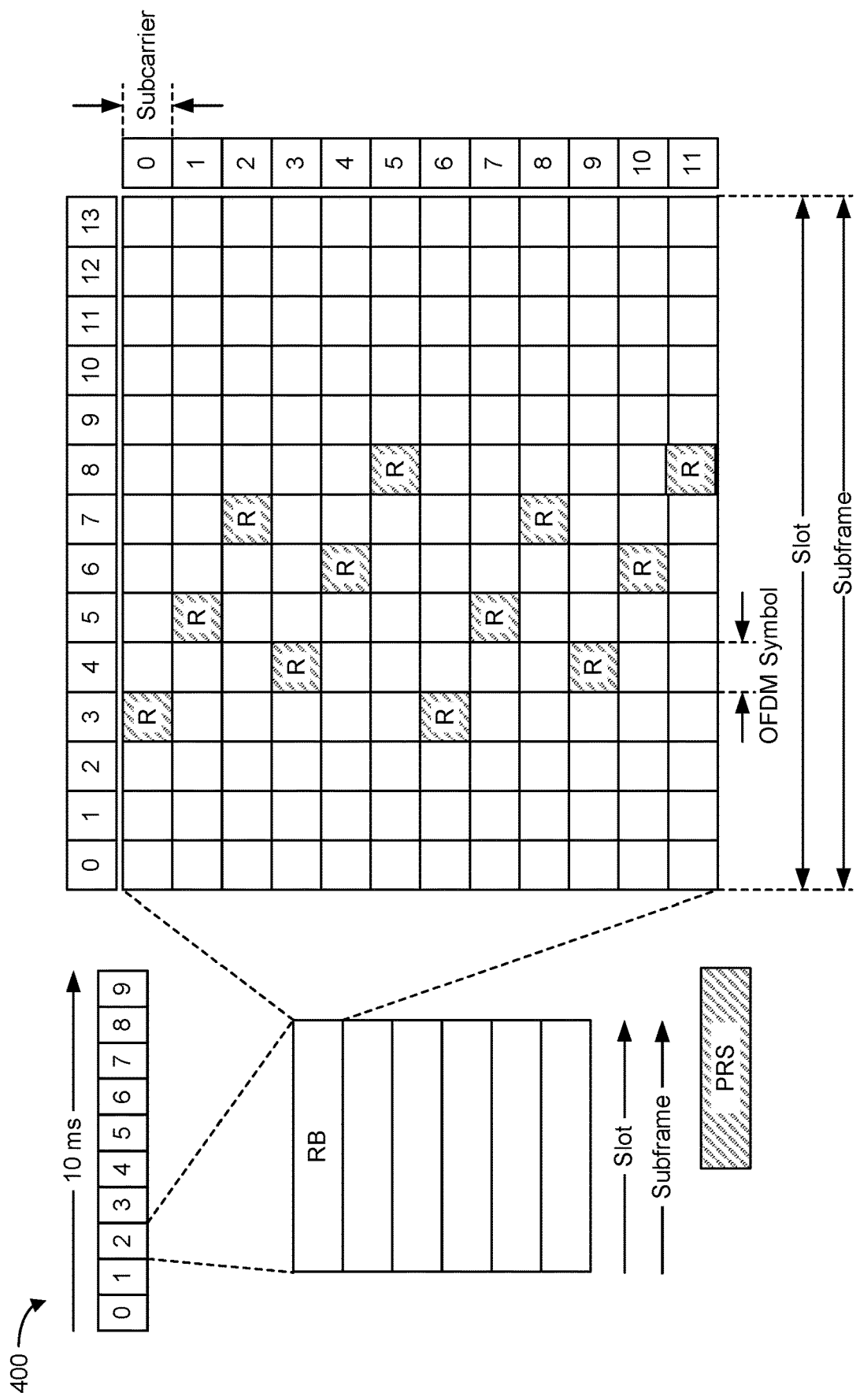
FIGS. 4A to 4D are diagrams illustrating example frame structures and channels within the frame structures, according to aspects of the disclosure.
Figure 4B:
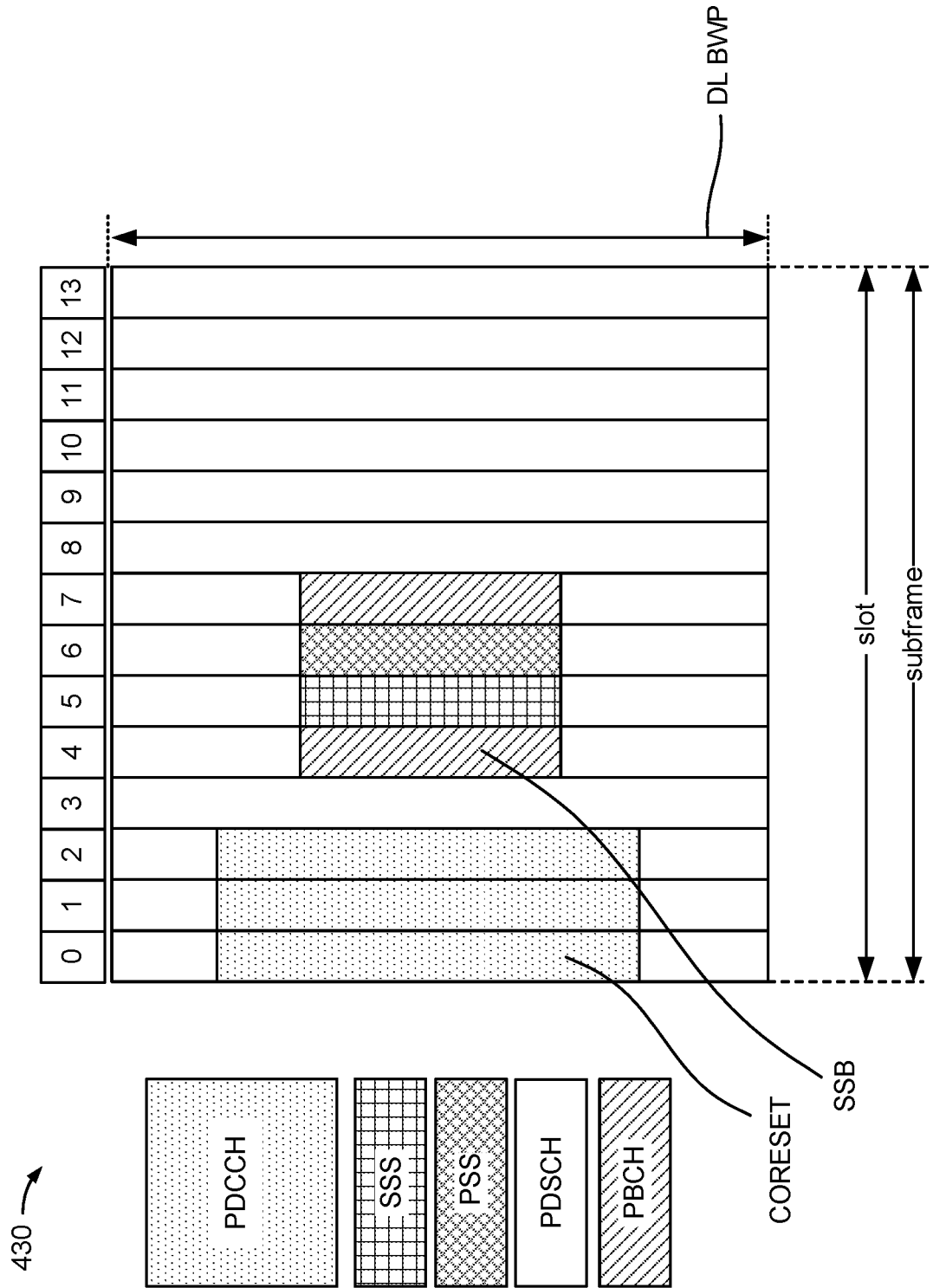
Figure 4C:
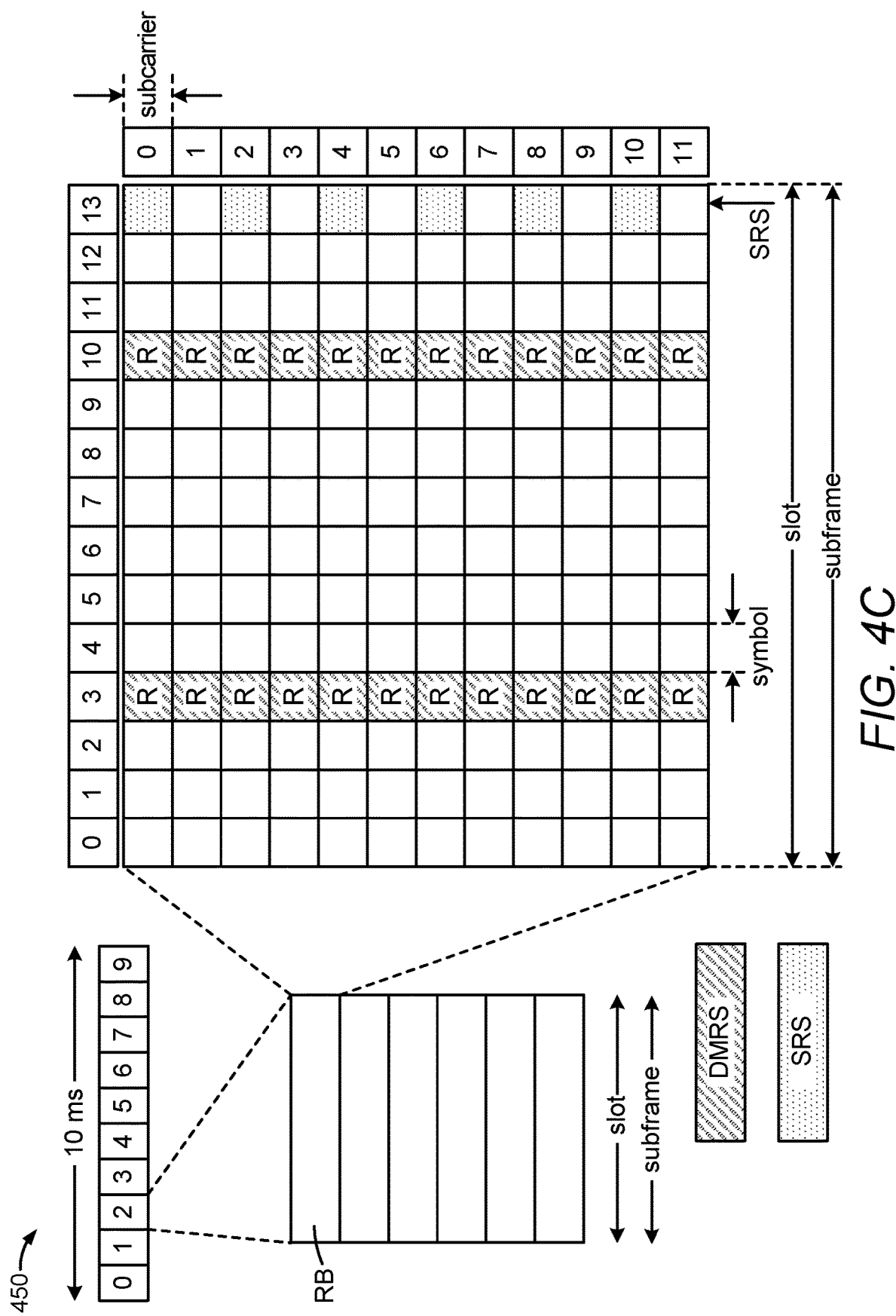
Figure 4D:
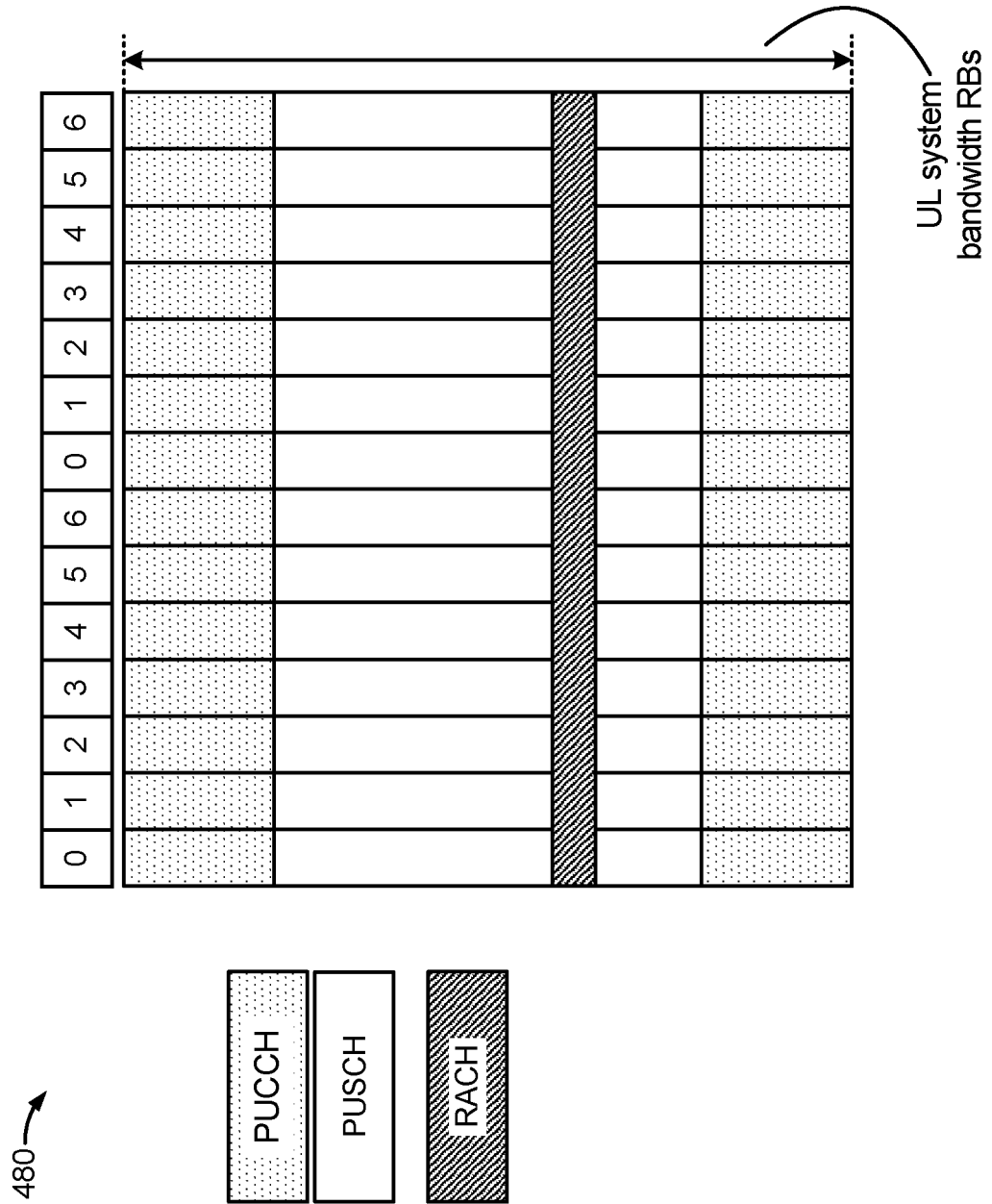

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 470 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

PRS are defined for NR positioning to enable UEs to detect and measure more neighbour TRPs. Several configurations are supported to enable a variety of deployments (e.g., indoor, outdoor, sub-6, mmW, etc.). Both UE-assisted and UE-based location calculations are supported in NR. In addition, positioning is supported in RRC CONNECTED, IDLE, and INACTIVE modes. The following table summarizes the types of reference signals that can be used for positioning measurements for various positioning methods.

TABLE 1

| DL/UL Reference Signals | UE Measurements | To facilitate support of the following positioning techniques |
| --- | --- | --- |
| DL-PRS | DL RSTD | DL-TDOA |
| DL-PRS | DL PRS RSRP | DL-TDOA, DL-AoD, Multi-RTT |
| DL-PRS, SRS-for-positioning | UE Rx-Tx | Multi-RTT |
| SSB/CSI-RS for radio resource management (RRM) | SS-RSRP (for RRM), SS-RSRQ (for RRM), CSI-RSRP (for RRM), CSI-RSRQ (for RRM) | E-CID |

PRS may be transmitted periodically, aperiodically, or on-demand. On-demand PRS refers to a request by a target device (e.g., UE or another entity) of appropriate PRS resources (e.g., subset of TRPs, specific directions/beams, periodicity, PRS configuration, etc.) based on the needs/demands determined by the target device. The NR DL-PRS design for FR1 and FR2 is expected to support localized (in time) NR DL-PRS transmissions with periodic and/or on-demand resource allocation. However, the signaling details for periodic and on-demand resource allocation have not been fully specified. For example, the signaling could allow an increase in resources assigned for DL-PRS transmission (e.g., increased bandwidth, specific TRPs, or beam directions) and could indicate when DL-PRS transmission is no longer needed. Increased DL-PRS transmission could be simplified by being restricted to only certain PRS configurations, which might be configured at the gNBs and/or an LMF. For example, there might be one set of PRS configuration parameters corresponding to "normal" PRS transmission in the absence of any request for increased PRS transmission. In some networks, the "normal" PRS transmission might equate to no PRS transmission at all (to minimize resource usage). There could then be one or more levels of increased PRS transmission, each associated with a different set of PRS configuration parameters. In the simplest case, PRS transmission might be turned on only when needed, according to a default set of PRS configuration parameters, and turned off when not needed.

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS also can be used as uplink positioning reference signals for uplink positioning procedures, such as UL-TDOA, multi-RTT, DL-AoA, etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In order to establish uplink synchronization and a radio resource control (RRC) connection with a base station (or more specifically, a serving cell/TRP), a UE needs to perform a random access procedure (also referred to as a random access channel (RACH) procedure or a physical random access channel (PRACH) procedure). There are two types of random access available in NR, contention based random access (CBRA), also referred to as "four-step" random access, and contention free random access (CFRA), also referred to as "three-step" random access. There is also a "two-step" random access procedure that may be performed instead of the four-step random access procedure in certain cases.

Figure 5:
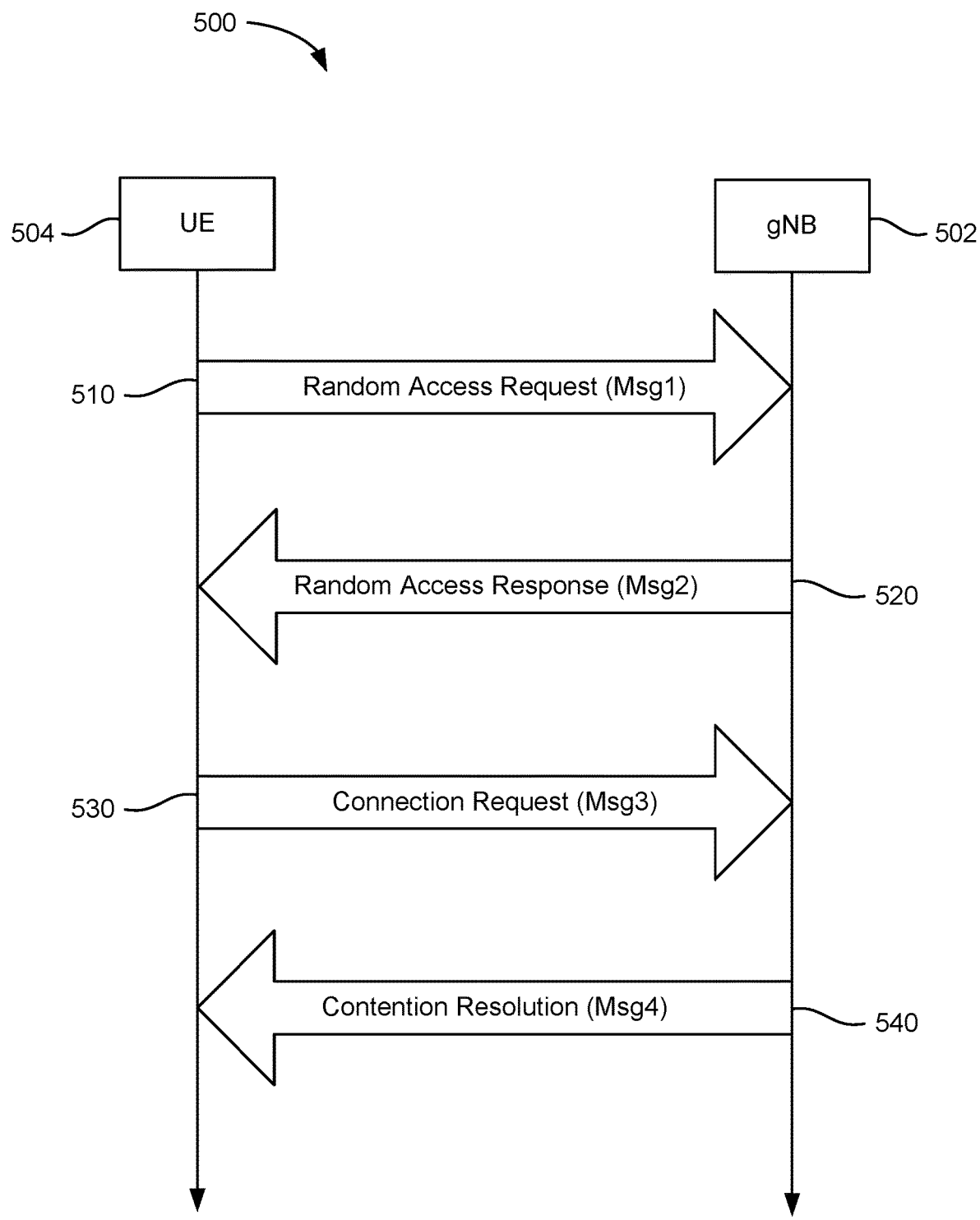
FIGS. 5 to 7 illustrate example random access procedures, according to aspects of the disclosure.

FIG. 5 illustrates an example four-step random access procedure 500, according to aspects of the disclosure. The four-step random access procedure 500 is performed between a UE 504 and a base station 502 (illustrated as a gNB), which may correspond to any of the UEs and base stations, respectively, described herein.

There are various situations in which a UE 504 may perform the four-step random access procedure 500. For example, a UE 504 may perform the four-step random access procedure 500 when performing an initial RRC connection setup (i.e., acquiring initial network access after coming out of the RRC IDLE state), when performing an RRC connection re-establishment procedure, when the UE 504 has uplink data to transmit, when the UE 504 has uplink data to transmit and the UE 504 is in an RRC CONNECTED state but there are no PUCCH resources available for a scheduling request (SR), or when there is a scheduling request failure.

Before performing the four-step random access procedure 500, the UE 504 reads one or more synchronization signal blocks (SSBs) broadcasted by the base station 502 with which the UE 504 is performing the four-step random access procedure 500. In NR, each beam transmitted by a base station (e.g., base station 502) is associated with a different SSB, and a UE (e.g., UE 504) selects a certain beam to use to communicate with the base station 502. Based on the SSB of the selected beam, the UE 504 can then read the system information block (SIB) type 1 (SIB1), which carries cell access related information and supplies the UE 504 with the scheduling of other system information blocks transmitted on the selected beam.

When the UE 504 sends the very first message of the four-step random access procedure 500 to the base station 502, it sends a specific pattern called a "preamble" (also referred to as a "RACH preamble," a "PRACH preamble," a "sequence"). The preamble differentiates requests from different UEs 504. In CBRA, a UE 504 selects a preamble randomly from a pool of preambles (64 in NR) shared with other UEs 504. However, if two UEs 504 use the same preamble at the same time, then there can be a collision, or contention.

Thus, at 510, the UE 504 selects one of the 64 preambles to send to the base station 502 in a random access request (also referred to as a "RACH request"). This message is referred to as "Message 1" or "Msg1" in a four-step random access procedure 500. Based on the synchronization information from the base station 502 (e.g., the SIB1), the UE 504 sends the preamble at the RACH occasion (RO) corresponding to the selected SSB/beam. More specifically, in order for the base station 502 to determine which beam the UE 504 has selected, a specific mapping is defined between an SSB and an RO (which occur every 10, 20, 40, 80, or 160 ms). By detecting at which RO the UE 504 sent the preamble, the base station 502 can determine which SSB/beam the UE 504 selected.

Note that an RO is a time-frequency transmission opportunity for transmitting a preamble, and a preamble index (i.e., a value from 0 to 63 for the 64 possible preambles) enables the UE 504 to generate the type of preamble expected at the base station 502. The RO and preamble index may be configured to the UE 504 by the base station 502 in a SIB. A RACH resource is an RO in which one preamble index is transmitted. As such, the terms "RO" (or "RACH occasion") and "RACH resource" may be used interchangeably, depending on the context.

Due to reciprocity, the UE 504 may use the uplink transmit beam corresponding to the best downlink receive beam determined during synchronization (i.e., the best receive beam to receive the selected downlink beam from the base station 502). That is, the UE 504 uses the parameters of the downlink receive beam used to receive the SSB beam from the base station 502 to determine the parameters of the uplink transmit beam. If reciprocity is available at the base station 502, the UE 504 can transmit the preamble over one beam. Otherwise, the UE 504 repeats transmission of the same preamble on all of its uplink transmit beams.

The UE 504 also needs to provide its identity to the network (via base station 502) so that the network can address it in the next step. This identity is called the random access radio network temporary identity (RA-RNTI) and is determined from the time slot in which the preamble is sent.

If the UE 504 does not receive a response from the base station 502 within some period of time, it increases its transmission power by a fixed step and sends the preamble/Msg1 again. More specifically, the UE 504 transmits a first set of repetitions of the preamble, then, if it does not receive a response, it increases its transmission power and transmits a second set of repetitions of the preamble. The UE 504 continues increasing its transmit power in incremental steps until it receives a response from the base station 502.

At 520, the base station 502 sends a random access response (RAR), referred to as a "Message 2" or "Msg2" in a four-step random access procedure 500, to the UE 504 on the selected beam. The RAR is sent on a physical downlink shared channel (PDSCH) and is addressed to the RA-RNTI calculated from the time slot (i.e., RO) in which the preamble was sent. The RAR carries the following information: a cell-radio network temporary identifier (C-RNTI), a timing advance (TA) value, and an uplink grant resource. The base station 502 assigns the C-RNTI to the UE 504 to enable further communication with the UE 504. The TA value specifies how much the UE 504 should change its timing to compensate for the propagation delay between the UE 504 and the base station 502. The uplink grant resource indicates the initial resources the UE 504 can use on the physical uplink shared channel (PUSCH). After this step, the UE 504 and the base station 502 establish coarse beam alignment that can be utilized in the subsequent steps.

At 530, using the allocated PUSCH, the UE 504 sends an RRC connection request message, referred to as a "Message 3" or "Msg3," to the base station 502. Because the UE 504 sends the Msg3 over the resources scheduled by the base station 502, the base station 502 knows from where (spatially) to detect the Msg3 and therefore which uplink receive beam should be used. Note that the Msg3 PUSCH can be sent on the same or different uplink transmit beam as the Msg1.

The UE 504 identifies itself in the Msg3 by the C-RNTI assigned in the previous step. The message contains the UE's 504 identity and connection establishment cause. The UE's 504 identity is either a temporary mobile subscriber identity (TMSI) or a random value. A TMSI is used if the UE 504 has previously connected to the same network. The UE 504 is identified in the core network by the TMSI. A random value is used if the UE 504 is connecting to the network for the very first time. The reason for the random value or TMSI is that the C-RNTI may have been assigned to more than one UE 504 in the previous step, due to multiple requests arriving at the same time. The connection establishment cause indicates the reason why the UE 504 needs to connect to the network (e.g., for a positioning session, because it has uplink data to transmit, because it received a page from the network, etc.).

As noted above, the four-step random access procedure 500 is a CBRA procedure. Thus, as described above, any UE 504 connecting to the same base station 502 can send the same preamble at 510, in which case, there is a possibility of collision, or contention, among the requests from the various UEs 504. Accordingly, the base station 502 uses a contention resolution mechanism to handle this type of access request. In this procedure, however, the result is random and not all random access succeeds.

Thus, at 540, if the Msg3 was successfully received, the base station 502 responds with a contention resolution message, referred to as a "Message 4" or "Msg4." This message is addressed to the TMSI or random value (from the Msg3) but contains a new C-RNTI that will be used for further communication. Specifically, the base station 502 sends the Msg4 in the PDSCH using the downlink transmit beam determined in the previous step.

As shown in FIG. 5, the four-step random-access procedure 500 requires two round-trip cycles between the UE 504 and the base station 502, which not only increases latency but also incurs additional control signaling overhead. To address these issues, two-step random access has been introduced in NR for CBRA. The motivation behind two-step random access is to reduce latency and control signaling overhead by having a single round trip cycle between a UE and a base station. This is achieved by combining the preamble (Msg1) and the scheduled PUSCH transmission (Msg3) into a single message from the UE to the base station, known as a RACH Message A ("MsgA"). Similarly, the random access response (Msg2) and the contention resolution message (Msg4) are combined into a single message from the base station to the UE, known as RACH Message B ("MsgB"). This reduces latency and control signaling overhead.

Figure 6:
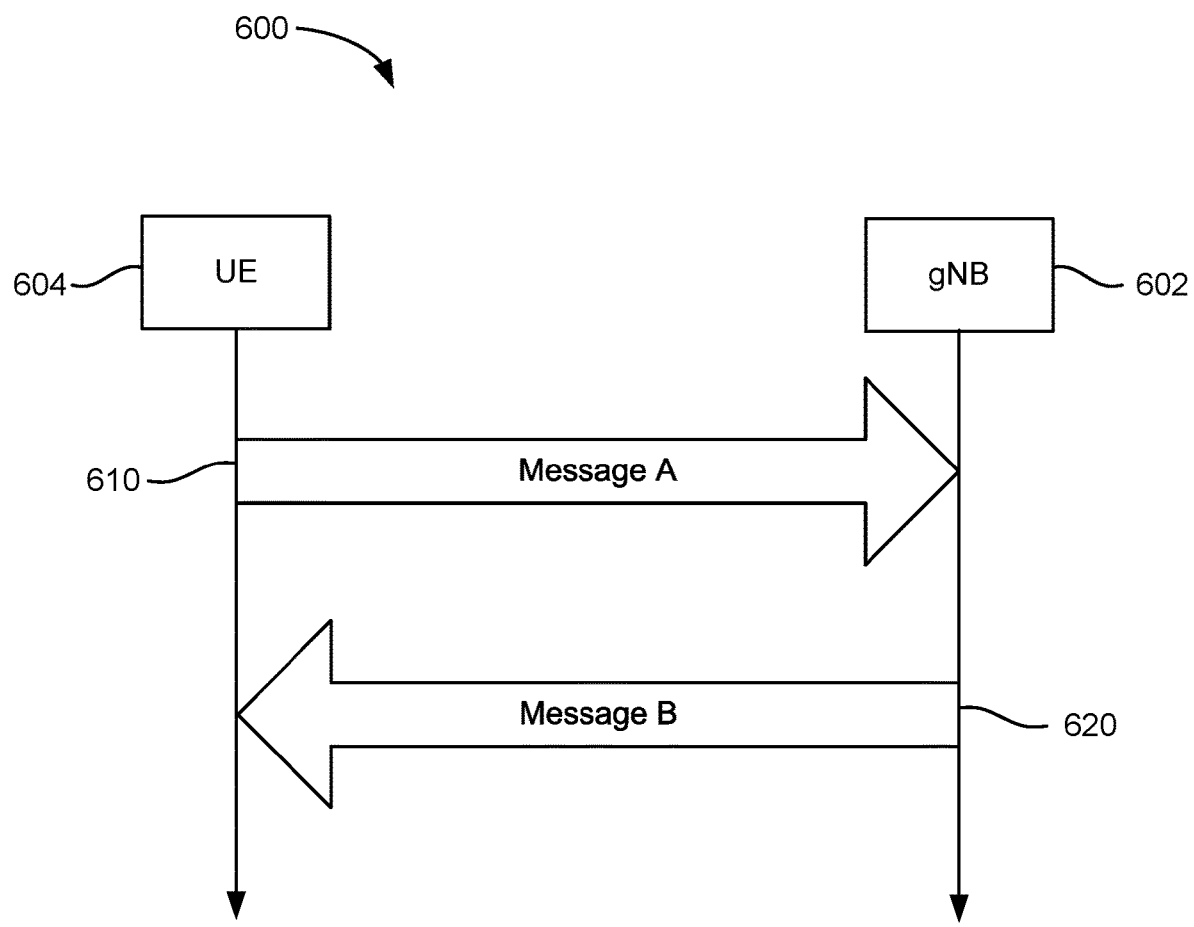

FIG. 6 illustrates an example two-step random access procedure 600, according to aspects of the disclosure. The two-step random access procedure 600 may be performed between a UE 604 and a base station 602 (illustrated as a gNB), which may correspond to any of the UEs and base stations, respectively, described herein.

At 610, the UE 604 transmits a MsgA to the base station 602. In a two-step random access procedure 600, Msg1 and Msg3, described above with reference to FIG. 5, are collapsed (i.e., combined) into a MsgA and sent to the base station 602. As such, a MsgA includes a preamble and a PUSCH similar to the Msg3 PUSCH of a four-step random access procedure 500. The preamble may have been selected from the 64 possible preambles, as described above with reference to FIG. 5, and may be used as a reference signal for demodulating the data transmitted in the MsgA. At 620, the UE 604 receives a MsgB from the base station 602. The MsgB may be a combination of Msg2 and Msg4 described above with reference to FIG. 5.

The combination of Msg1 and Msg3 into one MsgA and the combination of Msg2 and Msg4 into one MsgB allows the UE 604 to reduce random access setup time to support the low-latency requirements of NR. Although the UE 604 may be configured to support the two-step random access procedure 600, the UE 604 may still support the four-step random access procedure 500 as a fall back if the UE 604 is not able to use the two-step random access procedure 600 due to some constraints (e.g., high transmit power requirements, etc.). Therefore, a UE 604 in NR may be configured to support both the four-step and the two-step random access procedures 5 and 6, and may determine which random access procedure to use based on the RACH configuration information received from the base station 602.

In CFRA (also referred to as "three-step random access"), the base station assigns the preamble, which is therefore referred to as a "dedicated random access preamble" or simply a "dedicated preamble." A CFRA procedure can be performed when the UE is in an RRC CONNECTED state before the random access procedure, such as in the case of a handover. A CFRA procedure can also be performed for downlink data arrival, when transitioning out of the RRC INACTIVE state into the RRC CONNECTED state, when requesting specific system information (referred to as "on demand SI"), when adding a cell for NR non-standalone (NSA) networking, or when performing beam failure recovery.

Figure 7:
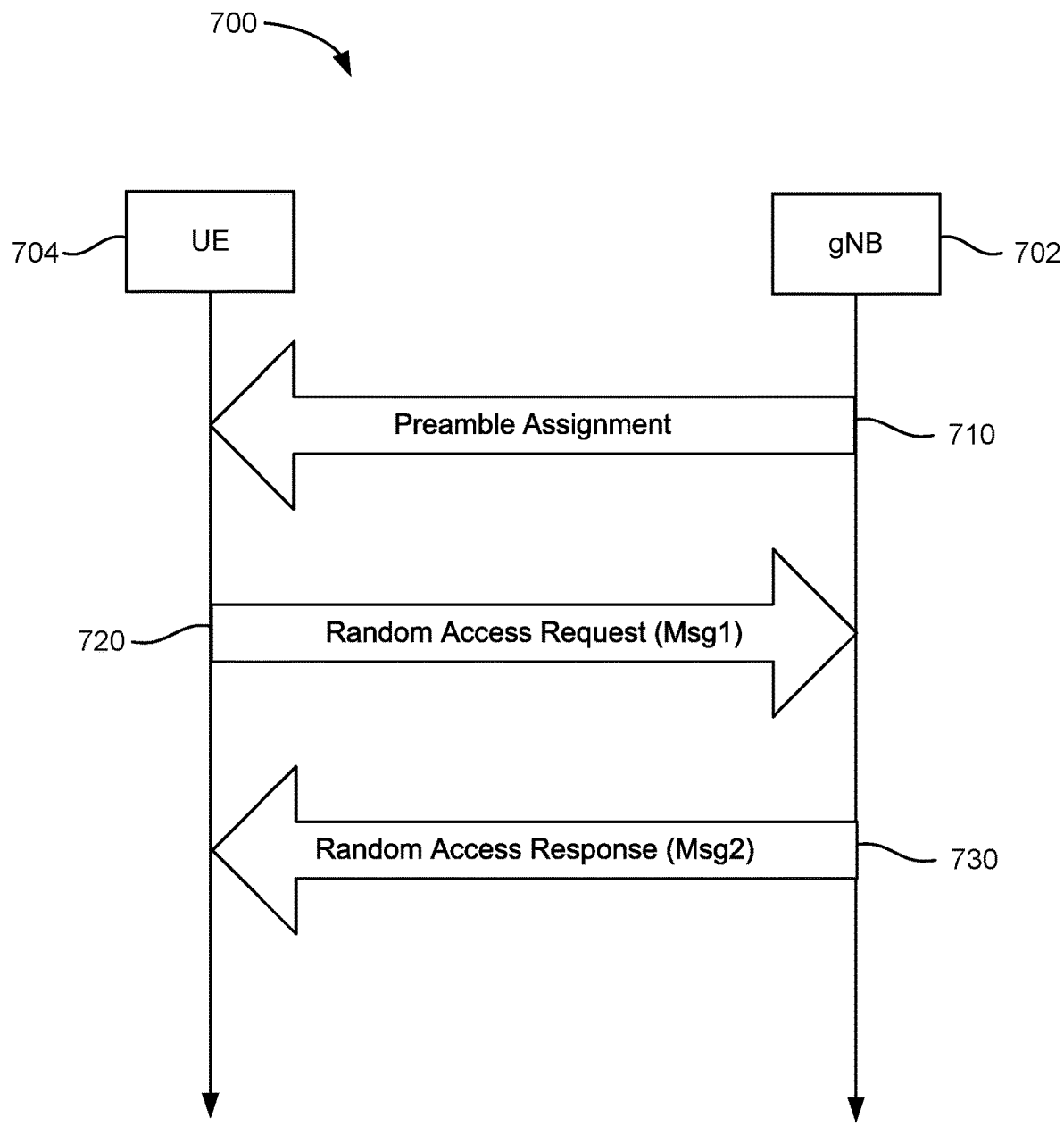

FIG. 7 illustrates an example three-step random access procedure 700, according to aspects of the disclosure. The three-step random access procedure 700 may be performed between a UE 704 and a base station 702 (illustrated as a gNB), which may correspond to any of the UEs and base stations, respectively, described herein.

At 710, the base station 702 assigns a dedicated preamble to the UE 704. If the UE 704 is in the RRC IDLE state, the base station 702 provides the dedicated preamble to the UE 704 via RRC signaling (i.e., within an RRC message). Alternatively, if the UE 704 is in the RRC INACTIVE state, the base station 702 provides the dedicated preamble to the UE 704 via physical layer signaling (e.g., DCI on the PDCCH). Because the preamble is specifically assigned to the UE 704, there is no preamble conflict with other UEs 704. However, when dedicated preamble resources are insufficient for the number of UEs 704 requesting random access, the base station 702 instructs additional UEs 704 to initiate CBRA.

As noted above, a three-step random access procedure 700 may be used in the case of a handover, downlink data arrival, and NSA networking. In the case of a handover, the "MobilityControlInfo" information element sent by the source base station 702 carries the allocated preamble. In the case of downlink data arrival (e.g., a physical downlink control channel (PDCCH) order), when downlink data arrives at the base station 702, the base station 702 instructs the UE 704 to initiate a three-step random access procedure 700 through a DCI command in the PDCCH, which carries or identifies the allocated preamble. In the case of NSA networking, when NR cells are added in NSA, the base station 702 instructs the UE 704 to initiate a three-step random access procedure 700 through the PDCCH, which carries or identifies the allocated preamble.

At 720, the UE 704 transmits a random access request ("Msg1") to the base station 702, as at 510 of FIG. 5, but using the assigned preamble instead of a randomly selected preamble. At 730, the UE 704 receives a random access response ("Msg2") from the base station 702, as at 520 of FIG. 5. In the case of a handover, the random access response at 730 contains the timing alignment information and initial uplink grant for the target base station. In the case of downlink data arrival, when downlink data arrives at the base station 702, the random access response at 730 contains the timing alignment information and random access preamble identifier (RAPID). In the case of NSA networking, when NR cells are added in NSA, the random access response at 730 contains the timing alignment information and RAPID.

As will be appreciated from the foregoing, a four-step random access procedure 500 typically takes longer to establish an uplink connection compare to a three-step random access procedure 700, which is faster and more efficient. However, as also described above, a UE cannot always perform a three-step random access procedure 700.

After a random access procedure, the UE is in an RRC CONNECTED state. The RRC protocol is used on the air interface between a UE and a base station. The major functions of the RRC protocol include connection establishment and release functions, broadcast of system information, radio bearer establishment, reconfiguration, and release, RRC connection mobility procedures, paging notification and release, and outer loop power control. In LTE, a UE may be in one of two RRC states (CONNECTED or IDLE), but in NR, a UE may be in one of three RRC states (CONNECTED, IDLE, or INACTIVE). The different RRC states have different radio resources associated with them that the UE can use when it is in a given state. Note that the different RRC states are often capitalized, as above; however, this is not necessary, and these states can also be written in lowercase.

Figure 8:
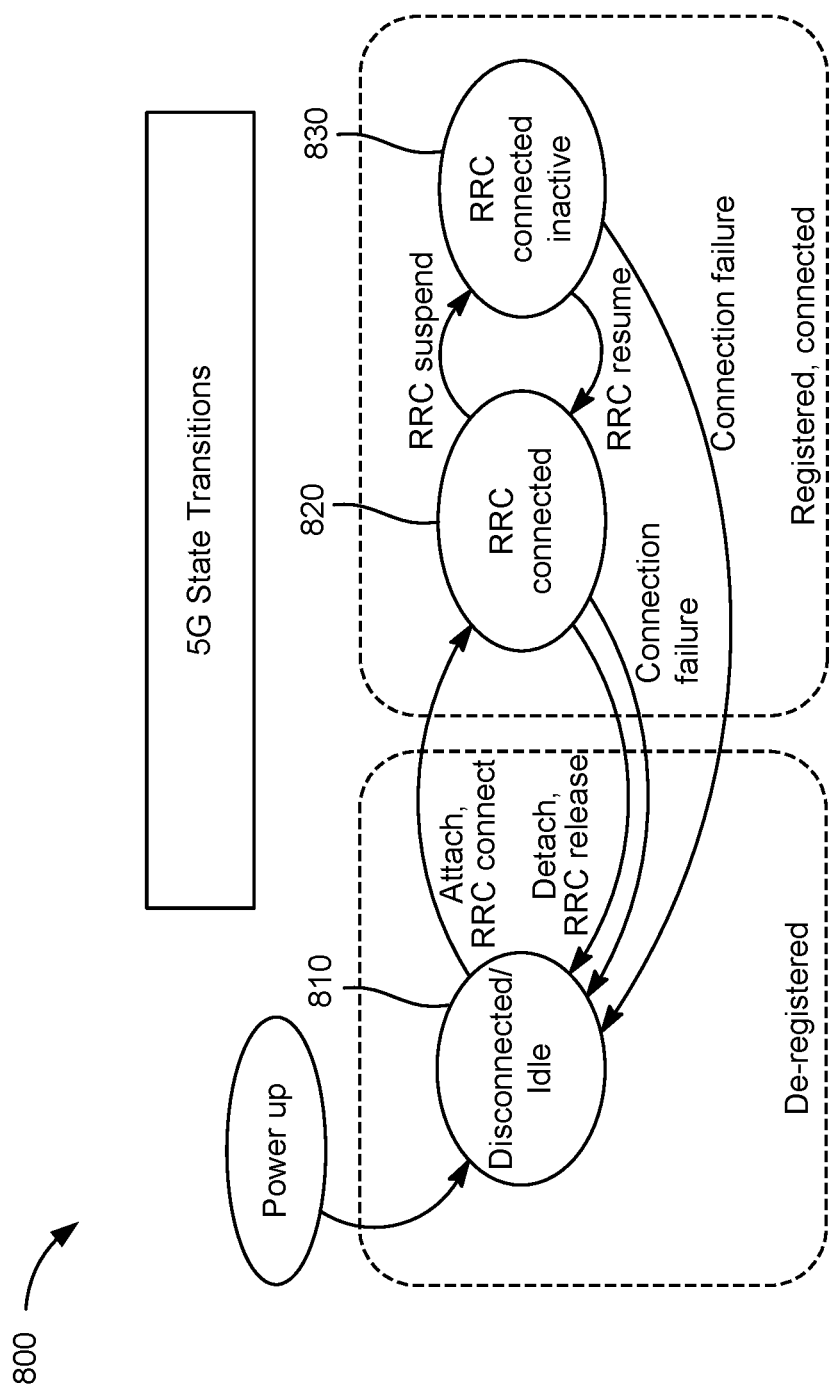
FIG. 8 illustrates the different radio resource control (RRC) states available in New Radio (NR), according to aspects of the disclosure.

FIG. 8 is a diagram 800 of the different RRC states (also referred to as RRC modes) available in NR, according to aspects of the disclosure. When a UE is powered up, it is initially in the RRC DISCONNECTED/IDLE state 810. After a random access procedure, it moves to the RRC CONNECTED state 820. If there is no activity at the UE for a short time, it can suspend its session by moving to the RRC INACTIVE state 830. The UE can resume its session by performing a random access procedure to transition back to the RRC CONNECTED state 820. Thus, the UE needs to perform a random access procedure to transition to the RRC CONNECTED state 820, regardless of whether the UE is in the RRC IDLE state 810 or the RRC INACTIVE state 830.

The operations performed in the RRC IDLE state 810 include public land mobile network (PLMN) selection, broadcast of system information, cell re-selection mobility, paging for mobile terminated data (initiated and managed by the 5GC), discontinuous reception (DRX) for core network paging (configured by non-access stratum (NAS)). The operations performed in the RRC CONNECTED state 820 include 5GC (e.g., 5GC 260) and New RAN (e.g., New RAN 220) connection establishment (both control and user planes), UE context storage at the New RAN and the UE, New RAN knowledge of the cell to which the UE belongs, transfer of unicast data to/from the UE, and network controlled mobility. The operations performed in the RRC INACTIVE state 830 include the broadcast of system information, cell re-selection for mobility, paging (initiated by the New RAN), RAN-based notification area (RNA) management (by the New RAN), DRX for RAN paging (configured by the New RAN), 5GC and New RAN connection establishment for the UE (both control and user planes), storage of the UE context in the New RAN and the UE, and New RAN knowledge of the RNA to which the UE belongs.

Figure 9:
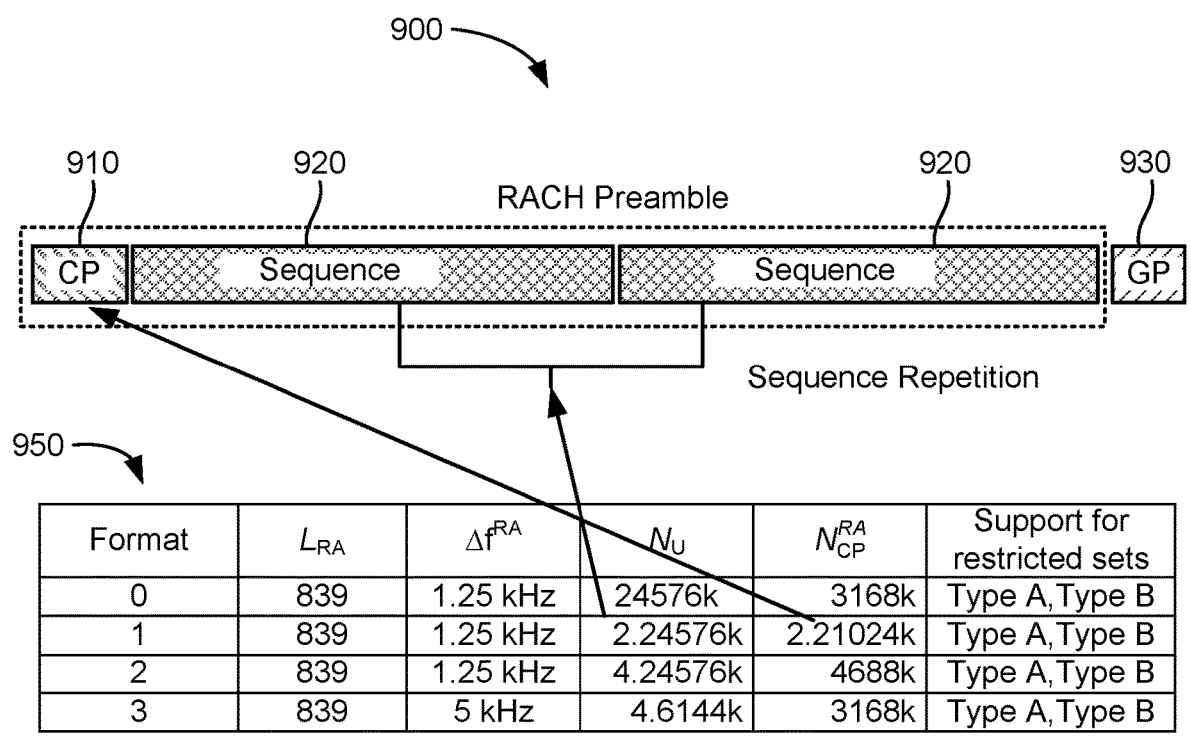
FIG. 9 is a diagram of an example RACH preamble, according to aspects of the disclosure.

As noted above, there are 64 preambles defined in NR—specifically, 64 preambles for each time-frequency RACH occasion (RO). FIG. 9 is a diagram of an example RACH preamble 900, according to aspects of the disclosure. As shown in FIG. 9, a RACH preamble 900 consists of two parts, a cyclic prefix (CP) 910 and a set of repetitions of a preamble sequence 920. It is followed by a guard period (GP) 930.

The number and length of the preamble repetitions are defined in table 950, and vary depending on the format ('0,' '1,' '2,' or '3') of the RACH preamble 900. Table 950 defines the length ($L_{RA}$), frequency ($\Delta f^{RA}$), sequence length ($N_u$), and CP length ($N_{CP}^{RA}$) of the RACH preamble 900. The preamble format is described below with reference to FIG. 9. Note that kappa (k) is defined as 64.

In NR, there are 13 types of preamble formats supported: Format 0, Format 1, Format 2, Format 3, Format A1, Format A2, Format A3, Format B1, Format B2, Format B3, Format B4, Format C0, and Format C1. These 13 types of preamble formats can be grouped into two categories: long preambles and short preambles. Long preambles have a length of 839 and short preambles have a length of 139. Long preambles use four of the 13 preamble formats, while short preambles use nine of the 13 preamble formats.

Figure 10:
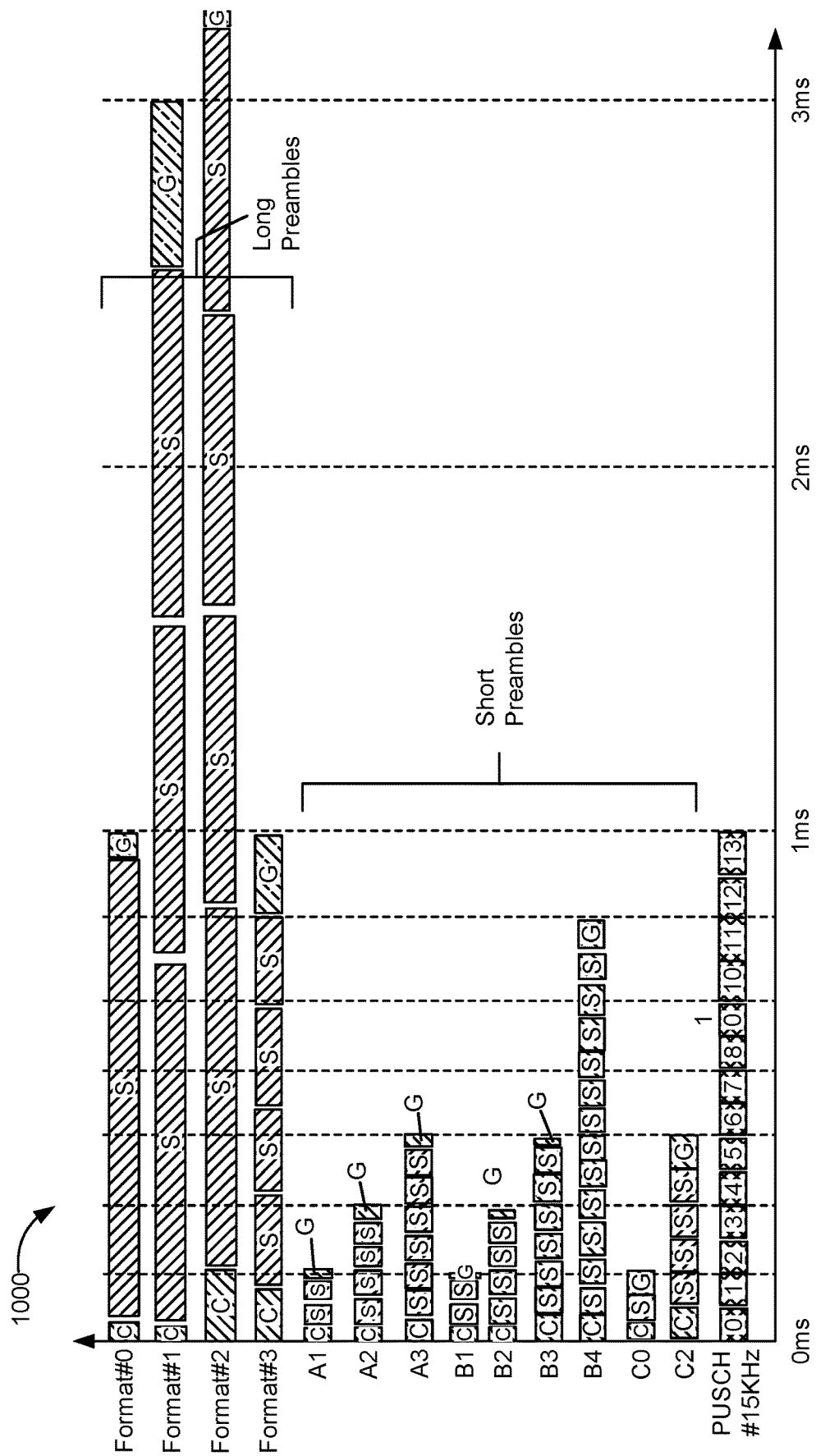
FIG. 10 is a graph illustrating the different preamble lengths and formats in NR.

FIG. 10 is a graph 1000 illustrating the different preamble lengths and formats in NR. The four formats of the long preambles are numbered "Format #0" to "Format #3" and the nine formats of the short preambles are numbered "A1" to "A3," "B1" to "B4," and "C0" and "C2." Each row of graph 1000 is an RO. Each RO begins with a cyclic prefix of some length (represented as "C"), has one or more repetitions of the preamble sequence (represented as "S"), and ends with a guard period of some length (represented as "G"). For reference, the last row of graph 1000 illustrates a subframe of a PUSCH for 15 kHz subcarrier spacing. As such, the subframe comprises one slot having a length of 1 ms and divided into 14 symbols.

The four formats for the long preambles are designed for large (i.e., macro) cell deployments in FR1, and are typically used in frequency bands below 6 GHz. The preamble format (i.e., '0' to '3') is part of the cell's random access configuration (broadcasted in the SIB), and each cell is generally limited to a single preamble format. In NR, the numerology used for long preambles is different from other NR transmissions, as the origin of long preambles is partly from the preambles used for LTE. For example, preamble formats '0' and '1' in NR are the same as preamble formats '0' and '2' in LTE. Preambles can use a subcarrier spacing of 1.25 kHz or 5 kHz. A long preamble with 1.25 kHz subcarrier spacing occupies six resource blocks in the frequency domain, while a preamble with five kHz subcarrier spacing occupies 24 resource blocks.

Short preambles are, in general, shorter than the long preambles, and often span only a few OFDM symbols (as shown in FIG. 10). The nine formats of the short preambles are designed for small cell deployments, including indoor coverage. These preamble formats can be used for both FR1 and FR2 ranges. The subcarrier spacing for short preambles is aligned with the normal NR subcarrier spacing (e.g., 15 kHz, 30 kHz, 60 kHz, and 120 kHz). In FR1, short preambles use 15 or 30 kHz subcarrier spacing, whereas in FR2, short preambles use 60 or 120 kHz subcarrier spacing. A short preamble occupies 12 resource blocks in the frequency domain, regardless of the preamble numerology.

Short preamble formats are designed such that the last part of each OFDM symbol acts as a cyclic prefix for the next OFDM symbol, and the length of a preamble OFDM symbol equals the length of a data OFDM symbol. In most cases, it is therefore possible to have multiple preamble transmissions multiplexed in time within a single RACH slot (where there are a configured number of RACH slots per data slot, see FIG. 10 below). In other words, for short preambles, there can be multiple ROs in the frequency domain as well as in the time domain within a single RACH slot (also referred to as a "PRACH slot"). Note, however, that a RACH slot is not necessarily commensurate with a data slot, as illustrated below with reference to FIG. 10.

NR supports a mix of the "A" and "B" preamble formats to enable additional formats such as "A1/B1," "A2/B2," and "A3/B3." Short preamble formats "A" and "B" are identical except for somewhat shorter cyclic prefixes for the "B" formats. Preamble formats "B2" and "B3" are used in combination with the corresponding "A" formats (i.e., "A2" and "A3").

Short preambles allow the base station receiver to use the same FFT for data and random access preamble detection. These preambles are a composition of multiple shorter OFDM symbols per PRACH preamble, making them more robust against time varying channels and frequency errors. Short preambles also support analog beam sweeping during PRACH reception such that the same preamble can be received with different beams at the base station.

As noted above, there are maximum of 64 preambles possible in NR. The present disclosure proposes to reserve a subset of these preambles for positioning. As a first option, the set of 64 preambles may be divided into two sets, one set consisting of "N" preambles reserved for communication, and one set consisting of "M" preambles reserved (dedicated) for positioning. As a second option, the set of 64 preambles may be divided into three sets, one set consisting of "N" preambles reserved for communication, one set consisting of "N1" preambles reserved for critical communication, and one set consisting of "M" preambles reserved for positioning.

A base station can broadcast the set of preambles reserved for positioning in what is referred to herein as a "positioning SIB." Currently, as described above, a base station broadcasts the available preambles (or identifiers of, or parameters needed to calculate, the available preambles) for random access in various SIBs. Thus, instead of broadcasting only one set of 64 possibly preambles, a base station may broadcast two or three sets of available preambles. The preambles reserved for communication may be broadcasted as normal (a normal SIB would simply include/identify fewer preambles), while the preambles reserved for positioning may be broadcasted in the disclosed positioning SIBs. Where the base station reserves a set of preambles for critical communication (e.g., low latency, high QoS, etc.), the base station may broadcast such preambles in another SIB that carries only those types of preambles.

A UE can use a dedicated positioning preamble for a UE-initiated or UE-initiated on-demand positioning request. More specifically, a UE can select a positioning preamble when it performs a random access procedure for a positioning session. In that way, the base station will know that the UE is involved in a positioning session, which will ensure that the UE will receive the uplink resources on time and meet the latency requirements of the positioning session. In an aspect, a network operator may charge extra for this feature, and only paid applications would be allowed to use this feature.

Note that using dedicated positioning preambles may still result in contention among UEs (where two or more UEs select the same positioning preamble at approximately the same time), but it is expected to be minimal as only UEs involved in a positioning session will be contesting for the positioning preambles.

Figure 11:
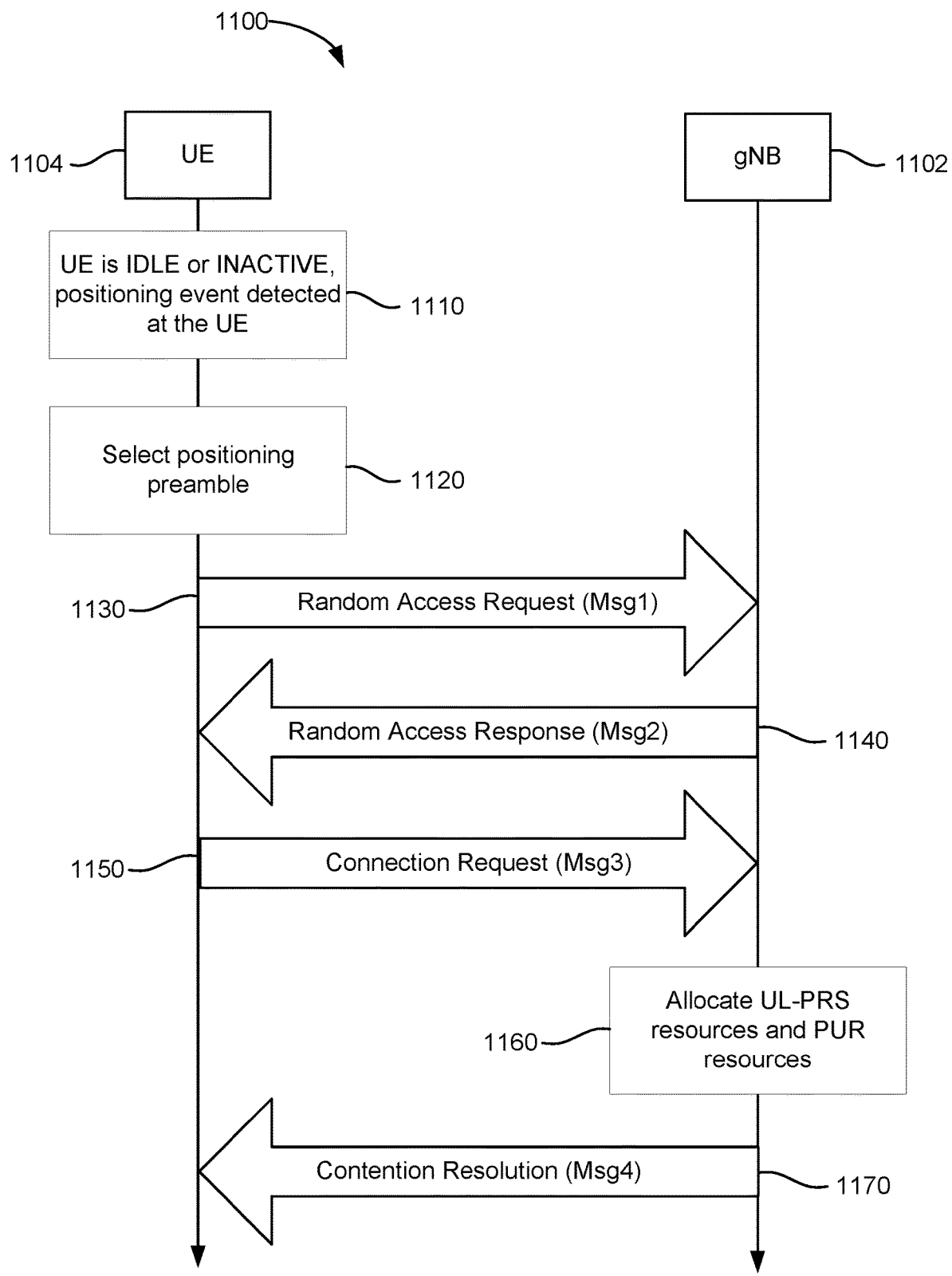
FIGS. 11 to 13 illustrate example random access procedures, according to aspects of the disclosure.

FIG. 11 illustrates an example four-step random access procedure 1100, according to aspects of the disclosure. The four-step random access procedure 1100 is performed between a UE 1104 and a base station 1102 (illustrated as a gNB), which may correspond to any of the UEs and base stations, respectively, described herein.

At 1110, the UE 1104 is in an RRC IDLE or INACTIVE state when a positioning event is detected at the UE 1104. The positioning event may be, for example, a request for the UE 1104 to transmit uplink positioning reference signals (e.g., SRS-for-positioning). The request may be received from a location server (e.g., location server 230, LMF 270, SLP 272), a third-party application, an external client, or the like.

At 1120, the UE 1104 selects a positioning preamble (containing a RACH positioning sequence) from the positioning preambles broadcasted by the base station 1102 in one or more positioning SIBs. At 1130, the UE 1104 sends a random access request (Msg1) to the base station 1102, as at 510 of FIG. 5. The random access request contains the selected positioning preamble, thereby indicating to the base station 1102 that the UE 1104 is involved in a positioning session. At 1140, the base station 1102 responds to the UE 1104 with a random access response (Msg2), as at 520 of FIG. 5.

At 1150, the UE 1104 sends a connection establishment request (Msg3) to the base station 1102, as at 530 of FIG. 5. The connection establishment request may include a connection establishment cause of "positioning." At 1160, the base station 1102 is aware that the UE 1104 is involved in a positioning session based on receiving the positioning preamble at 1130. Accordingly, the base station 1102 determines an uplink positioning configuration for the UE 1104 to use to transmit uplink positioning reference signals (UL-PRS) for the positioning session.

At 1170, the base station 1102 sends a contention resolution message (Msg4) to the UE 1104, as at 540 of FIG. 5. The contention resolution message indicates the uplink positioning configuration and preconfigured uplink resources (PUR) configuration (i.e., uplink time and/or frequency resources allocated for uplink transmission) for the positioning session. Because the contention resolution message contains the uplink positioning configuration, the UE 1104 does not need to transition to the RRC CONNECTED state (if it is only performing the four-step random access procedure 1100 to obtain a positioning configuration for transmission of UL-PRS). As such, the UE 1104 can stay in the RRC IDLE or INACTIVE state even after completion of the four-step random access procedure 1100. As will be appreciated, this reduces latency and power consumption at the UE 1104.

Figure 12:
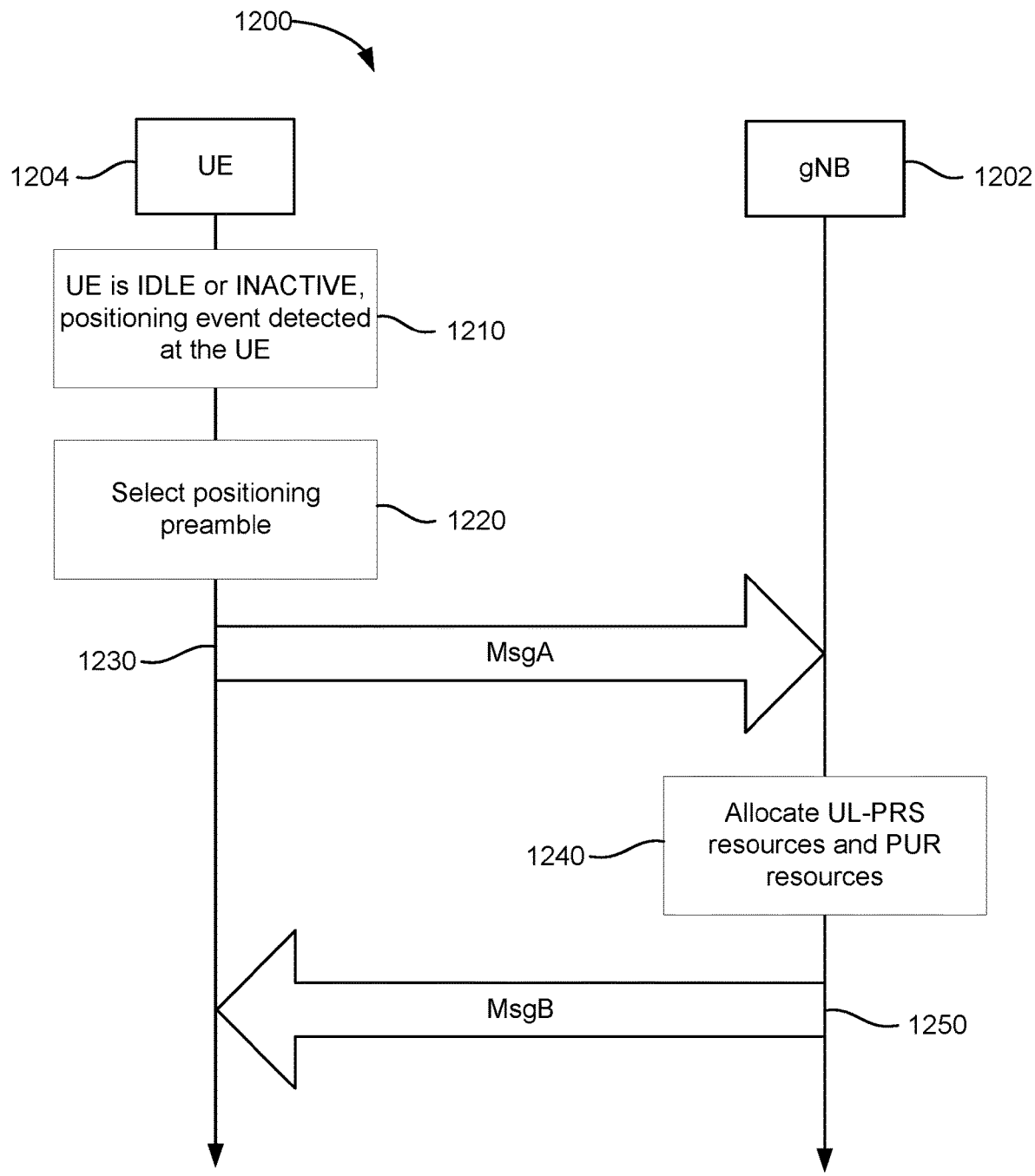

FIG. 12 illustrates an example two-step random access procedure 1200, according to aspects of the disclosure. The two-step random access procedure 1200 is performed between a UE 1204 and a base station 1202 (illustrated as a gNB), which may correspond to any of the UEs and base stations, respectively, described herein.

At 1210, the UE 1204 is in an RRC IDLE or INACTIVE state when a positioning event is detected. The positioning event may be, for example, a request for the UE 1204 to transmit uplink positioning reference signals (e.g., SRS-for-positioning). The request may be received from a location server (e.g., location server 230, LMF 270, SLP 272), a third-party application, an external client, or the like.

At 1220, the UE 1204 selects a positioning preamble (containing a RACH positioning sequence) from the positioning preambles broadcasted by the base station 1002 in one or more positioning SIBs. At 1230, the UE 1204 sends a MsgA to the base station 1202, as at 610 of FIG. 6. The MsgA contains the selected positioning preamble, thereby indicating to the base station 1202 that the UE 1204 is involved in a positioning session and needs to have uplink positioning resource configured to it.

At 1240, the base station 1202 is aware that the UE 1204 is involved in a positioning session based on receiving the positioning preamble at 1230. Accordingly, the base station 1202 determines an uplink positioning configuration for the UE 1204 to use to transmit uplink positioning reference signals (UL-PRS) for the positioning session. At 1250, the base station 1202 sends a MsgB to the UE 1204, as at 620 of FIG. 6. The MsgB indicates the uplink positioning configuration and PUR resources for the positioning session. Because the MsgB contains the uplink positioning configuration, the UE 1204 does not need to transition to the RRC CONNECTED state (if it is only performing the two-step random access procedure 1200 to obtain a positioning configuration for transmission of UL-PRS). As will be appreciated, this reduces latency and power consumption at the UE 1204.

The foregoing has described UE-initiated positioning sessions, which may be triggered while the UE is in an RRC IDLE or RRC INACTIVE state. However, in some cases, the network (e.g., location server, serving base station, third-party client, etc.) may initiate a positioning session, and may do so while the UE is in an RRC IDLE or RRC INACTIVE state. Alternatively or additionally, during a positioning session, whether UE-initiated or network-initiated, the UE may go through multiple cycles of RRC IDLE, INACTIVE, and CONNECTED modes (e.g., as in the case of a long location tracking session). For every transition from IDLE to CONNECTED and INACTIVE to CONNECTED, the UE needs to perform a random access procedure. The serving base station may not be aware that a positioning session is ongoing, and therefore, its decision of whether to assign a dedicated preamble (as in CFRA) is independent of the positioning session and the positioning requirements. That is, the serving base station can choose either CBRA or CFRA for the UE without knowledge of the ongoing positioning session, much less the requirements of the positioning session.

Accordingly, the present disclosure provides techniques for the location server to inform the serving base station about the positioning session and the criticality of the positioning session. For example, the location server may indicate that the positioning session has normal latency requirements, or that it needs to meet ultra-reliable low-latency communication (URLLC) requirements. The location server may provide this information as, for example, an end-to-end latency value or a latency classification (e.g., "normal," "URLLC," etc.). The location server may provide this information to the base station in one or more LPP type A (LPPa) or NR positioning protocol type A (NRPPa) messages.

Based on the latency requirements of the positioning session, the base station is expected to assign a dedicated preamble for positioning to enable the UE to perform CFRA. As with a normal preamble, the dedicated preamble can be assigned to the UE via RRC signaling for IDLE to CONNECTED RRC state transitions. Similarly, as with a normal preamble, the dedicated preamble can be assigned to the UE via physical layer signaling (e.g., DCI on the PDCCH) for INACTIVE to CONNECTED RRC state transitions.

Figure 13:
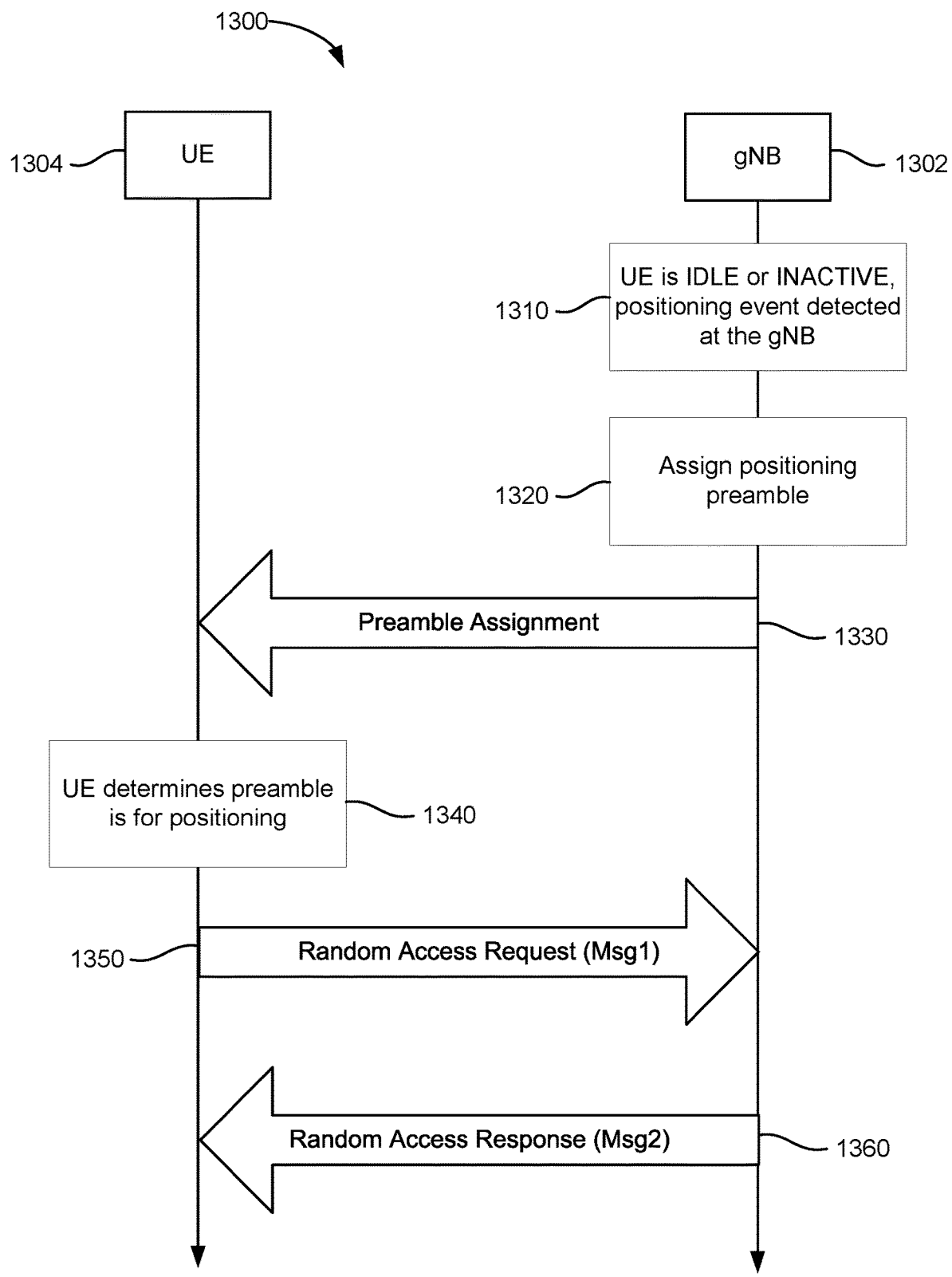

FIG. 13 illustrates an example three-step random access procedure 1300, according to aspects of the disclosure. The three-step random access procedure 1300 is performed between a UE 1304 and a base station 1302 (illustrated as a gNB), which may correspond to any of the UEs and base stations, respectively, described herein.

At 1310, the UE 1304 is in an RRC IDLE or INACTIVE state when a positioning event is detected at the base station 1302. The positioning event may be, for example, a request for the base station 1302 to allocation uplink or downlink positioning resources to the UE 1304. The request may be received from a location server (e.g., location server 230, LMF 270, SLP 272).

At 1320, the base station 1302 selects a positioning preamble (containing a RACH positioning sequence) from the dedicated/reserved positioning preambles. At 1330, the base station 1302 sends a preamble assignment to the UE 1304, as at 710 of FIG. 7. At 1340, the UE 1304 determines that the assigned preamble is a positioning preamble. At 1350, the UE 1304 sends a random access request (Msg1) to the base station 1302, as at 720 of FIG. 7. The random access request contains the assigned positioning preamble.

At 1340, the base station 1302 responds to the UE 1304 with a random access response (Msg2), as at 730 of FIG. 7. The random access response indicates the uplink positioning configuration and PUR resources for the positioning session. Because the random access response contains the uplink positioning configuration, the UE 1304 does not need to transition to the RRC CONNECTED state (if it is only performing the three-step random access procedure 1300 to obtain a positioning configuration for transmission of UL-PRS). As such, the UE 1304 can remain in the RRC IDLE or INACTIVE state even after completion of the three-step random access procedure 1300. As will be appreciated, this reduces latency and power consumption at the UE 1304.

After receiving the positioning configuration in the last step of random access procedures 1100, 1200, and 1300, the respective UE can transmit uplink positioning signals (e.g., SRS-for-positioning) on the allocated resources.

Figure 14:
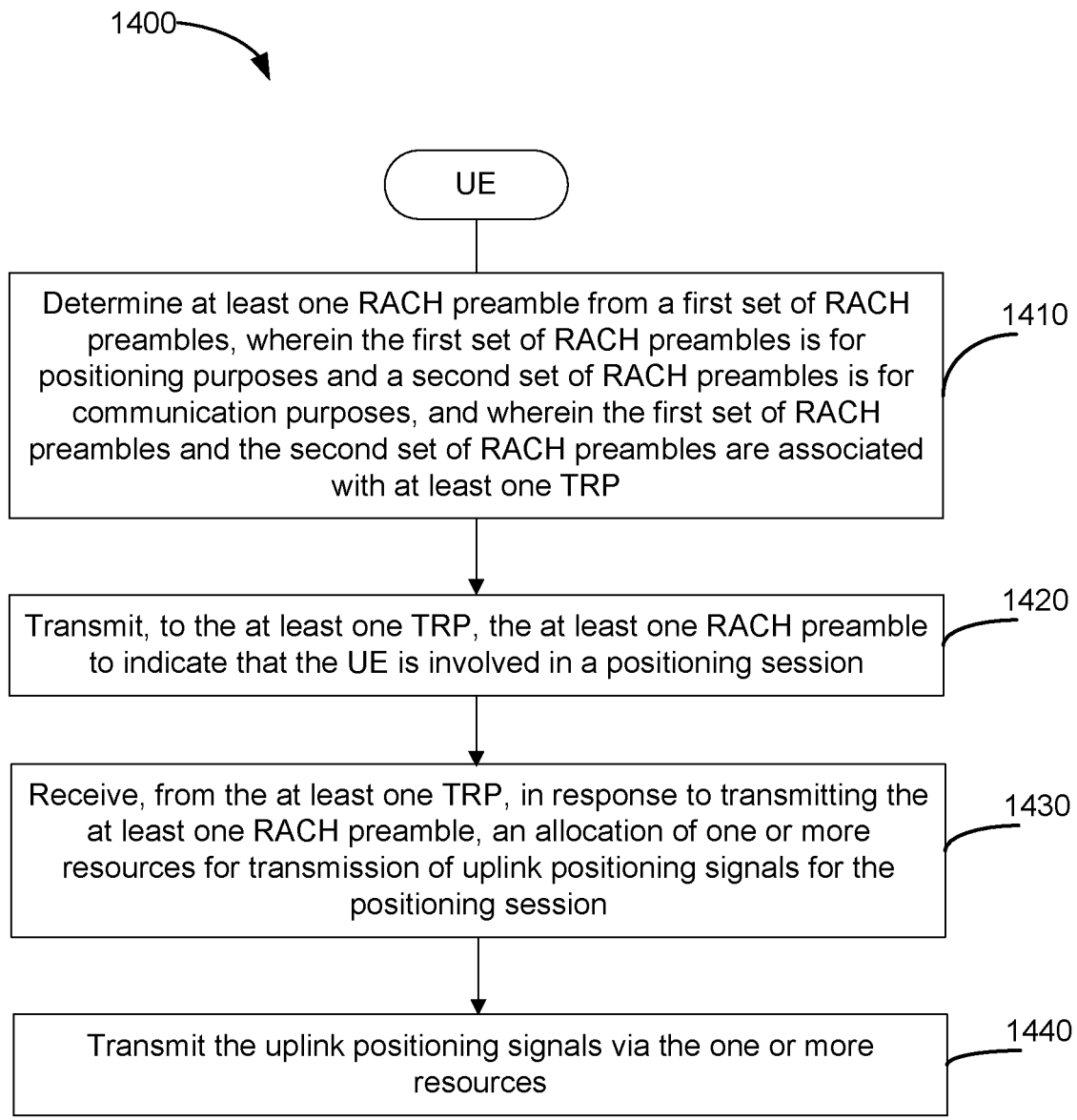
FIGS. 14 and 15 illustrate example methods of wireless communication, according to aspects of the disclosure.

FIG. 14 illustrates an example method 1400 for wireless communication, according to aspects of the disclosure. In an aspect, the method 1400 may be performed by a UE (e.g., any of the UEs described herein).

At 1410, the UE determines at least one RACH preamble from a first set of RACH preambles, as at 1120 of FIG. 11, 1220 of FIG. 12, or 1330 of FIG. 13. In an aspect, the first set of RACH preambles is for positioning purposes and a second set of RACH preambles is for communication purposes. The first set of RACH preambles and the second set of RACH preambles may be reserved for positioning purposes and communication purposes, respectively, or one or both sets may be used for positioning purposes and communication purposes. For example, if there are no preambles available in the first set of RACH preambles (because all are in use), one or more preambles in the second set of RACH preambles may be used for positioning. Similarly, if there are no preambles available in the second set of RACH preambles (because all are in use), one or more preambles in the first set of RACH preambles may be used for communication. In an aspect, the first set of RACH preambles and the second set of RACH preambles are associated with at least one TRP. In an aspect, operation 1410 may be performed by WWAN transceiver 310, processing system 332, memory component 340, and/or positioning component 342, any or all of which may be considered means for performing this operation.

At 1420, the UE transmits, to the at least one TRP (e.g., a TRP of any of the base stations described herein), the at least one RACH preamble to indicate that the UE is involved in a positioning session, as at 1130 of FIG. 11, 1230 of FIG. 12, or 1350 of FIG. 13. In an aspect, operation 1420 may be performed by WWAN transceiver 310, processing system 332, memory component 340, and/or positioning component 342, any or all of which may be considered means for performing this operation.

At 1430, the UE receives, from the at least one TRP, in response to transmitting the at least one RACH preamble at 1420, an allocation of one or more resources for transmission of uplink positioning signals (e.g., SRS-for-positioning) for the positioning session, as at 1170 of FIG. 11, 1250 of FIG. 12, or 1360 of FIG. 13. In an aspect, operation 1430 may be performed by WWAN transceiver 310, processing system 332, memory component 340, and/or positioning component 342, any or all of which may be considered means for performing this operation.

At 1440, the UE transmits the uplink positioning signals via the one or more resources. In an aspect, operation 1440 may be performed by WWAN transceiver 310, processing system 332, memory component 340, and/or positioning component 342, any or all of which may be considered means for performing this operation.

Figure 15:
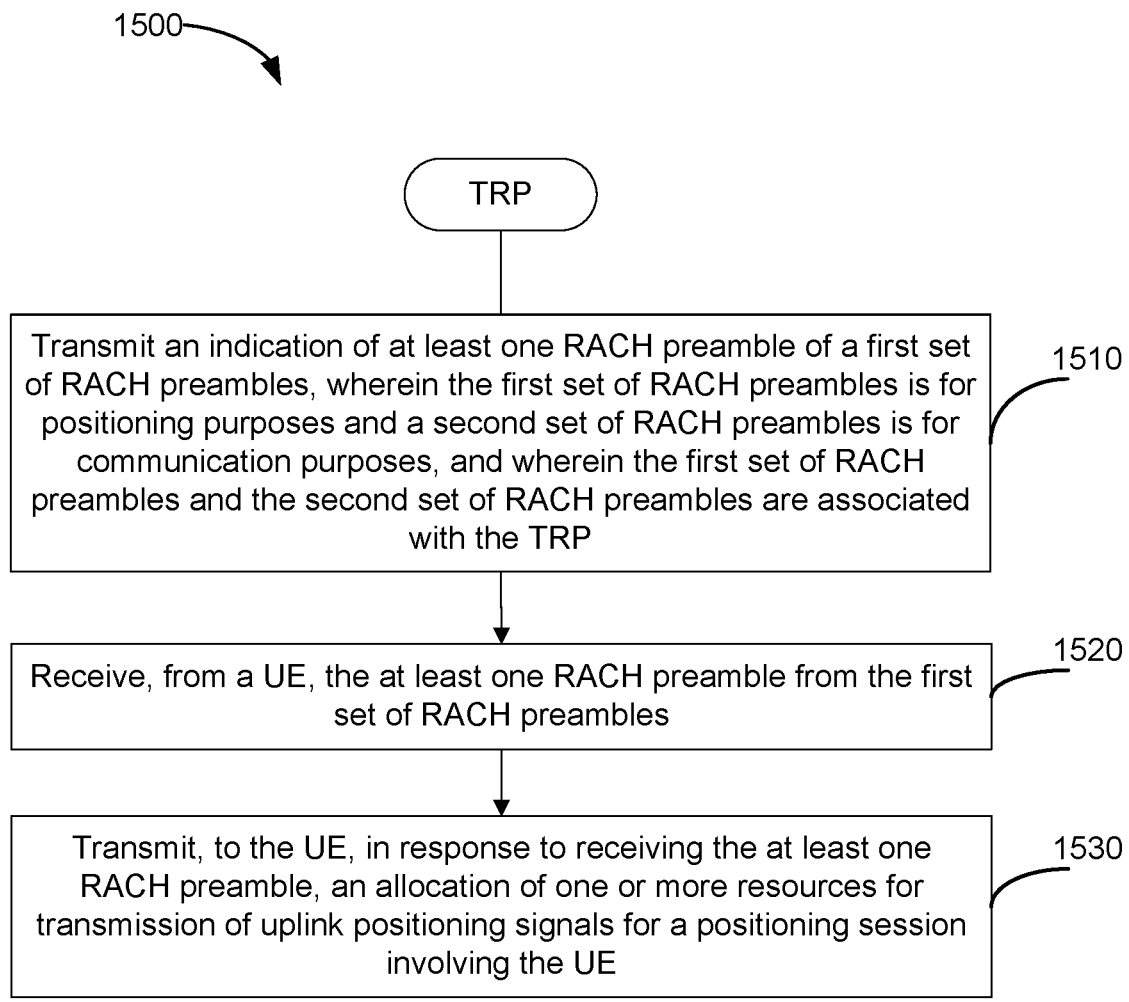

FIG. 15 illustrates an example method 1500 of wireless communication, according to aspects of the disclosure. In an aspect, the method 1500 may be performed by a TRP (e.g., a TRP of any of the base stations described herein).

At 1510, the TRP transmits an indication of at least one RACH preamble of a first set of RACH preambles. In an aspect, the first set of RACH preambles is for positioning purposes and a second set of RACH preambles is for communication purposes. The first set of RACH preambles and the second set of RACH preambles may be reserved for positioning purposes and communication purposes, respectively, or one or both sets may be used for positioning purposes and communication purposes. For example, if there are no preambles available in the first set of RACH preambles (because all are in use), one or more preambles in the second set of RACH preambles may be used for positioning. Similarly, if there are no preambles available in the second set of RACH preambles (because all are in use), one or more preambles in the first set of RACH preambles may be used for communication. In an aspect, the first set of RACH preambles and the second set of RACH preambles are associated with the TRP. In an aspect, operation 1510 may be performed by WWAN transceiver 350, processing system 384, memory component 386, and/or positioning component 388, any or all of which may be considered means for performing this operation.

At 1520, the TRP receives, from a UE (e.g., any of the UEs described herein), the at least one RACH preamble from the first set of RACH preambles, as at 1130 of FIG. 11, 1230 of FIG. 12, or 1350 of FIG. 13. In an aspect, operation 1520 may be performed by WWAN transceiver 350, processing system 384, memory component 386, and/or positioning component 388, any or all of which may be considered means for performing this operation.

At 1530, the TRP transmits, to the UE, in response to receiving the at least one RACH preamble at 1520, an allocation of one or more resources for transmission of uplink positioning signals for a positioning session involving the UE, as at 1170 of FIG. 11, 1250 of FIG. 12, or 1360 of FIG. 13. In an aspect, operation 1530 may be performed by WWAN transceiver 350, processing system 384, memory component 386, and/or positioning component 388, any or all of which may be considered means for performing this operation.

As will be appreciated, technical advantages of the methods 1400 and 1500 include reduced latency for positioning sessions, better multiplexing of RACH resources between different use cases (e.g., communication and positioning), and lower collision probability.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: determining at least one random access channel (RACH) preamble from a first set of RACH preambles, wherein the first set of RACH preambles is for positioning purposes and a second set of RACH preambles is for communication purposes, and wherein the first set of RACH preambles and the second set of RACH preambles are associated with at least one transmission-reception point (TRP); transmitting, to the at least one TRP, the at least one RACH preamble to indicate that the UE is involved in a positioning session; receiving, from the at least one TRP, in response to transmitting the at least one RACH preamble, an allocation of one or more resources for transmission of uplink positioning signals for the positioning session; and transmitting the uplink positioning signals via the one or more resources.

Clause 2. The method of clause 1, wherein the UE is in a radio resource control (RRC) idle or an RRC inactive state when the UE transmits the at least one RACH preamble, receives the allocation, and transmits the uplink positioning signals.

Clause 3. The method of any of clauses 1 to 2, wherein the allocation is received in a fourth message of a four-step RACH procedure.

Clause 4. The method of clause 3, wherein the determining comprises: receiving, from the at least one TRP, a system information block (SIB) indicating at least the first set of RACH preambles; and selecting the at least one RACH preamble from the first set of RACH preambles.

Clause 5. The method of any of clauses 1 to 2, wherein the allocation is received in a second message of a two-step RACH procedure.

Clause 6. The method of clause 5, wherein the determining comprises: receiving, from the at least one TRP, an assignment of the at least one RACH preamble from the first set of RACH preambles.

Clause 7. The method of clause 6, wherein the UE transmits the at least one RACH preamble in response to reception of the assignment.

Clause 8. The method of any of clauses 6 to 7, wherein reception of the assignment of the at least one RACH preamble from the first set of RACH preambles indicates that the UE is involved in the positioning session.

Clause 9. The method of any of clauses 6 to 8, wherein: the UE is in an RRC idle state, and the UE receives the assignment in RRC signaling.

Clause 10. The method of any of clauses 6 to 8, wherein: the UE is in an RRC inactive state, and the UE receives the assignment in physical layer signaling.

Clause 11. The method of any of clauses 1 to 10, further comprising: receiving, from the at least one TRP, a preconfigured uplink resources (PUR) configuration.

Clause 12. The method of clause 11, wherein the PUR configuration is received in: a fourth message of a four-step RACH procedure, or a second message of a two-step RACH procedure.

Clause 13. The method of any of clauses 1 to 12, wherein the first set of RACH preambles and the second set of RACH preambles are all RACH preambles associated with the at least one TRP for network access.

Clause 14. The method of any of clauses 1 to 13, wherein a sum of the first set of RACH preambles and the second set of RACH preambles is 64.

Clause 15. The method of any of clauses 1 to 14, wherein a third set of RACH preambles associated with the at least one TRP is reserved for critical communication.

Clause 16. The method of clause 15, wherein a sum of the first set of RACH preambles, the second set of RACH preambles, and the third set of RACH preambles is 64.

Clause 17. A method of wireless communication performed by a transmission-reception point (TRP), comprising: transmitting an indication of at least one random access channel (RACH) preamble of a first set of RACH preambles, wherein the first set of RACH preambles is for positioning purposes and a second set of RACH preambles is for communication purposes, and wherein the first set of RACH preambles and the second set of RACH preambles are associated with the TRP; receiving, from a user equipment (UE), the at least one RACH preamble from the first set of RACH preambles; and transmitting, to the UE, in response to receiving the at least one RACH preamble, an allocation of one or more resources for transmission of uplink positioning signals for a positioning session involving the UE.

Clause 18. The method of clause 17, wherein the UE is in a radio resource control (RRC) idle or an RRC inactive state when the TRP receives the at least one RACH preamble and transmits the allocation.

Clause 19. The method of any of clauses 17 to 18, wherein the allocation is transmitted in a fourth message of a four-step RACH procedure.

Clause 20. The method of clause 19, wherein the transmitting the indication comprises:
broadcasting a system information block (SIB) indicating at least the first set of RACH preambles.

Clause 21. The method of clause 20, wherein reception of the at least one RACH preamble from the first set of RACH preambles indicates that the UE is involved in the positioning session.

Clause 22. The method of any of clauses 17 to 18, wherein the allocation is transmitted in a second message of a two-step RACH procedure.

Clause 23. The method of clause 22, wherein the transmitting the indication comprises:
transmitting, to the UE, an assignment of the at least one RACH preamble from the first set of RACH preambles.

Clause 24. The method of clause 23, wherein: the UE is in an RRC idle state, and the TRP transmits the assignment in RRC signaling.

Clause 25. The method of clause 23, wherein: the UE is in an RRC inactive state, and the TRP transmits the assignment in physical layer signaling.

Clause 26. The method of any of clauses 23 to 25, further comprising: detecting that the UE is involved in the positioning session, wherein the TRP transmits the assignment in response to detecting that the UE is involved in the positioning session.

Clause 27. The method of clause 26, wherein the TRP detects that the UE is involved in the positioning session based on reception of a request from a location server to allocate positioning resources to the UE.

Clause 28. The method of clause 27, wherein the request from the location server comprises a Long-Term Evolution (LTE) positioning protocol (LPP) type A (LPPa) request.

Clause 29. The method of any of clauses 27 to 28, wherein the request includes a latency requirement for the positioning session.

Clause 30. The method of clause 29, wherein the latency requirement comprises: an indication that the positioning session has normal latency, an indication that the positioning session is for ultra-reliable low-latency (URLL) communication, or an indication of an end-to-end latency for the positioning session.

Clause 31. The method of any of clauses 17 to 30, further comprising: transmitting, to the UE, a preconfigured uplink resources (PUR) configuration.

Clause 32. The method of clause 31, wherein the PUR configuration is transmitted in: a fourth message of a four-step RACH procedure, or a second message of a two-step RACH procedure.

Clause 33. The method of any of clauses 17 to 32, wherein the first set of RACH preambles and the second set of RACH preambles are all RACH preambles associated with the TRP for network access.

Clause 34. The method of any of clauses 17 to 33, wherein a sum of the first set of RACH preambles and the second set of RACH preambles is 64.

Clause 35. The method of any of clauses 17 to 34, wherein a third set of RACH preambles associated with the TRP is reserved for critical communication.

Clause 36. The method of clause 35, wherein a sum of the first set of RACH preambles, the second set of RACH preambles, and the third set of RACH preambles is 64.

Clause 37. An apparatus comprising a memory and at least one processor communicatively coupled to the memory, the memory and the at least one processor configured to perform a method according to any of clauses 1 to 36.

Clause 38. An apparatus comprising means for performing a method according to any of clauses 1 to 36.

Clause 39. A non-transitory computer-readable medium storing computer-executable instructions, the computer-executable comprising at least one instruction for causing a computer or processor to perform a method according to any of clauses 1 to 36.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   determining at least one random access channel (RACH) preamble from a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, wherein the first set of RACH preambles, the second set of RACH preambles, and the third set of preambles are associated with at least one transmission-reception point (TRP), and wherein a sum of the first set of RACH preambles, the second set of RACH preambles, and the third set of preambles is equal to 64;
   transmitting, to the at least one TRP, the at least one RACH preamble to indicate that the UE is involved in a positioning session;
   receiving, from the at least one TRP, in response to transmitting the at least one RACH preamble, an allocation of one or more resources for transmission of uplink positioning signals for the positioning session; and
   transmitting the uplink positioning signals via the one or more resources.

2. The method of claim 1, wherein the UE is in an RRC idle or an RRC inactive state when the UE transmits the at least one RACH preamble, receives the allocation, and transmits the uplink positioning signals.

3. The method of claim 1, wherein the allocation is received in a fourth message of a four-step RACH procedure.

4. The method of claim 3, wherein the determining comprises:
   receiving, from the at least one TRP, a system information block (SIB) indicating at least the first set of RACH preambles; and
   selecting the at least one RACH preamble from the first set of RACH preambles.

5. The method of claim 1, wherein the allocation is received in a second message of a two-step RACH procedure.

6. The method of claim 5, wherein the determining comprises:
   receiving, from the at least one TRP, an assignment of the at least one RACH preamble from the first set of RACH preambles.

7. The method of claim 6, wherein the UE transmits the at least one RACH preamble in response to reception of the assignment.

8. The method of claim 6, wherein reception of the assignment of the at least one RACH preamble from the first set of RACH preambles indicates that the UE is involved in the positioning session.

9. The method of claim 6, wherein:
   the UE is in an RRC idle state, and
   the UE receives the assignment in RRC signaling.

10. The method of claim 6, wherein:
    the UE is in an RRC inactive state, and
    the UE receives the assignment in physical layer signaling.

11. The method of claim 1, further comprising:
    receiving, from the at least one TRP, a preconfigured uplink resources (PUR) configuration.

12. The method of claim 11, wherein the PUR configuration is received in:
a fourth message of a four-step RACH procedure, or
a second message of a two-step RACH procedure.

13. The method of claim 1, wherein the first set of RACH preambles and the second set of RACH preambles are all RACH preambles associated with the at least one TRP for network access.

14. A method of wireless communication performed by a transmission-reception point (TRP), comprising:
transmitting an indication of at least one random access channel (RACH) preamble of a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, and wherein a sum of the first set of RACH preambles, the second set of RACH preambles, and the third set of preambles is equal to 64;
receiving, from a user equipment (UE), the at least one RACH preamble from the first set of RACH preambles; and
transmitting, to the UE, in response to receiving the at least one RACH preamble, an allocation of one or more resources for transmission of uplink positioning signals for a positioning session involving the UE.

15. The method of claim 14, wherein the UE is in an RRC idle or an RRC inactive state when the TRP receives the at least one RACH preamble and transmits the allocation.

16. The method of claim 14, wherein the allocation is transmitted in a fourth message of a four-step RACH procedure.

17. The method of claim 16, wherein the transmitting the indication comprises:
broadcasting a system information block (SIB) indicating at least the first set of RACH preambles.

18. The method of claim 17, wherein reception of the at least one RACH preamble from the first set of RACH preambles indicates that the UE is involved in the positioning session.

19. The method of claim 14, wherein the allocation is transmitted in a second message of a two-step RACH procedure.

20. The method of claim 19, wherein the transmitting the indication comprises:
transmitting, to the UE, an assignment of the at least one RACH preamble from the first set of RACH preambles.

21. The method of claim 20, wherein:
the UE is in an RRC idle state, and
the TRP transmits the assignment in RRC signaling.

22. The method of claim 20, wherein:
the UE is in an RRC inactive state, and
the TRP transmits the assignment in physical layer signaling.

23. The method of claim 20, further comprising:
detecting that the UE is involved in the positioning session, wherein the TRP transmits the assignment in response to detecting that the UE is involved in the positioning session.

24. The method of claim 23, wherein the TRP detects that the UE is involved in the positioning session based on reception of a request from a location server to allocate positioning resources to the UE.

25. The method of claim 24, wherein the request from the location server comprises a Long-Term Evolution (LTE) positioning protocol (LPP) type A (LPPa) request.

26. The method of claim 24, wherein the request includes a latency requirement for the positioning session.

27. The method of claim 26, wherein the latency requirement comprises:
an indication that the positioning session has normal latency,
an indication that the positioning session is for ultra-reliable low-latency (URLL) communication, or
an indication of an end-to-end latency for the positioning session.

28. The method of claim 14, further comprising:
transmitting, to the UE, a preconfigured uplink resources (PUR) configuration.

29. The method of claim 28, wherein the PUR configuration is transmitted in:
a fourth message of a four-step RACH procedure, or
a second message of a two-step RACH procedure.

30. The method of claim 14, wherein the first set of RACH preambles and the second set of RACH preambles are all RACH preambles associated with the TRP for network access.

31. A user equipment (UE), comprising:
a memory;
at least one transceiver; and
at least one processor communicatively coupled to the memory and the at least one transceiver, the at least one processor configured to:
determine at least one random access channel (RACH) preamble from a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, wherein the first set of RACH preambles, the second set of RACH preambles, and the third set of preambles are associated with at least one transmission-reception point (TRP), and wherein a sum of the first set of RACH preambles, the second set of RACH preambles, and the third set of preambles is equal to 64;
cause the at least one transceiver to transmit, to the at least one TRP, the at least one RACH preamble to indicate that the UE is involved in a positioning session;
receive, from the at least one TRP, in response to transmitting the at least one RACH preamble, an allocation of one or more resources for transmission of uplink positioning signals for the positioning session; and
cause the at least one transceiver to transmit the uplink positioning signals via the one or more resources.

32. The UE of claim 31, wherein the UE is in an RRC idle or an RRC inactive state when the UE transmits the at least one RACH preamble, receives the allocation, and transmits the uplink positioning signals.

33. The UE of claim 31, wherein the allocation is received in a fourth message of a four-step RACH procedure.

34. The UE of claim 33, wherein the at least one processor being configured to determine comprises the at least one processor being configured to:

receive, from the at least one TRP, a system information block (SIB) indicating at least the first set of RACH preambles; and select the at least one RACH preamble from the first set of RACH preambles.

35. The UE of claim 31, wherein the allocation is received in a second message of a two-step RACH procedure.

36. The UE of claim 35, wherein the at least one processor being configured to determine comprises the at least one processor being configured to:

receive, from the at least one TRP, an assignment of the at least one RACH preamble from the first set of RACH preambles.

37. The UE of claim 36, wherein the UE transmits the at least one RACH preamble in response to reception of the assignment.

38. The UE of claim 36, wherein reception of the assignment of the at least one RACH preamble from the first set of RACH preambles indicates that the UE is involved in the positioning session.

39. The UE of claim 36, wherein:
the UE is in an RRC idle state, and
the UE receives the assignment in RRC signaling.

40. The UE of claim 36, wherein:
the UE is in an RRC inactive state, and
the UE receives the assignment in physical layer signaling.

41. The UE of claim 31, wherein the at least one processor is further configured to:

receive, from the at least one TRP, a preconfigured uplink resources (PUR) configuration.

42. The UE of claim 41, wherein the PUR configuration is received in:
a fourth message of a four-step RACH procedure, or
a second message of a two-step RACH procedure.

43. The UE of claim 31, wherein the first set of RACH preambles and the second set of RACH preambles are all RACH preambles associated with the at least one TRP for network access.

44. A transmission-reception point (TRP), comprising:
a memory;
at least one transceiver; and
at least one processor communicatively coupled to the memory and the at least one transceiver, the at least one processor configured to:
cause the at least one transceiver to transmit an indication of at least one random access channel (RACH) preamble of a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, and wherein a sum of the first set of RACH preambles, the second set of RACH preambles, and the third set of preambles is equal to 64;
receive, from a user equipment (UE), the at least one RACH preamble from the first set of RACH preambles; and
cause the at least one transceiver to transmit, to the UE, in response to receiving the at least one RACH preamble, an allocation of one or more resources for transmission of uplink positioning signals for a positioning session involving the UE.

45. The TRP of claim 44, wherein the UE is in an RRC idle or an RRC inactive state when the TRP receives the at least one RACH preamble and transmits the allocation.

46. The TRP of claim 44, wherein the allocation is transmitted in a fourth message of a four-step RACH procedure.

47. The TRP of claim 46, wherein the at least one processor being configured to cause the at least one transceiver to transmit the indication comprises the at least one processor being configured to:
cause the at least one transceiver to broadcast a system information block (SIB) indicating at least the first set of RACH preambles.

48. The TRP of claim 47, wherein reception of the at least one RACH preamble from the first set of RACH preambles indicates that the UE is involved in the positioning session.

49. The TRP of claim 44, wherein the allocation is transmitted in a second message of a two-step RACH procedure.

50. The TRP of claim 49, wherein the at least one processor being configured to cause the at least one transceiver to transmit the indication comprises the at least one processor being configured to:
cause the at least one transceiver to transmit, to the UE, an assignment of the at least one RACH preamble from the first set of RACH preambles.

51. The TRP of claim 50, wherein:
the UE is in an RRC idle state, and
the TRP transmits the assignment in RRC signaling.

52. The TRP of claim 50, wherein:
the UE is in an RRC inactive state, and
the TRP transmits the assignment in physical layer signaling.

53. The TRP of claim 50, wherein the at least one processor is further configured to:
detect that the UE is involved in the positioning session, wherein the TRP transmits the assignment in response to detecting that the UE is involved in the positioning session.

54. The TRP of claim 53, wherein the TRP detects that the UE is involved in the positioning session based on reception of a request from a location server to allocate positioning resources to the UE.

55. The TRP of claim 54, wherein the request from the location server comprises a Long-Term Evolution (LTE) positioning protocol (LPP) type A (LPPa) request.

56. The TRP of claim 54, wherein the request includes a latency requirement for the positioning session.

57. The TRP of claim 56, wherein the latency requirement comprises:
an indication that the positioning session has normal latency,
an indication that the positioning session is for ultra-reliable low-latency (URLL) communication, or
an indication of an end-to-end latency for the positioning session.

58. The TRP of claim 44, wherein the at least one processor is further configured to:
cause the at least one transceiver to transmit, to the UE, a preconfigured uplink resources (PUR) configuration.

59. The TRP of claim 58, wherein the PUR configuration is transmitted in:
a fourth message of a four-step RACH procedure, or
a second message of a two-step RACH procedure.

60. The TRP of claim 44, wherein the first set of RACH preambles and the second set of RACH preambles are all RACH preambles associated with the TRP for network access.

61. A user equipment (UE), comprising:
means for determining at least one random access channel (RACH) preamble from a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, wherein the first set of RACH preambles, the second set of RACH preambles, and the third set of preambles are associated with at least one transmission-reception point (TRP), and wherein a sum of the first set of RACH preambles, the second set of RACH preambles, and the third set of preambles is equal to 64;
means for transmitting, to the at least one TRP, the at least one RACH preamble to indicate that the UE is involved in a positioning session;
means for receiving, from the at least one TRP, in response to transmitting the at least one RACH preamble, an allocation of one or more resources for transmission of uplink positioning signals for the positioning session; and
means for transmitting the uplink positioning signals via the one or more resources.

62. A transmission-reception point (TRP), comprising:
means for transmitting an indication of at least one random access channel (RACH) preamble of a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, and wherein a sum of the first set of RACH preambles, the second set of RACH preambles, and the third set of preambles is equal to 64;
means for receiving, from a user equipment (UE), the at least one RACH preamble from the first set of RACH preambles; and
means for transmitting, to the UE, in response to receiving the at least one RACH preamble, an allocation of one or more resources for transmission of uplink positioning signals for a positioning session involving the UE.

63. A non-transitory computer-readable medium storing computer-executable instructions, the computer-executable instructions comprising:
at least one instruction instructing a user equipment (UE) to determine at least one random access channel (RACH) preamble from a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, wherein the first set of RACH preambles, the second set of RACH preambles, and the third set of preambles are associated with at least one transmission-reception point (TRP), and wherein a sum of the first set of RACH preambles, the second set of RACH preambles, and the third set of preambles is equal to 64;
at least one instruction instructing the UE to transmit, to the at least one TRP, the at least one RACH preamble to indicate that the UE is involved in a positioning session;
at least one instruction instructing the UE to receive, from the at least one TRP, in response to transmitting the at least one RACH preamble, an allocation of one or more resources for transmission of uplink positioning signals for the positioning session; and
at least one instruction instructing the UE to transmit the uplink positioning signals via the one or more resources.

64. A non-transitory computer-readable medium storing computer-executable instructions, the computer-executable instructions comprising:
at least one instruction instructing a transmission-reception point (TRP) to transmit an indication of at least one random access channel (RACH) preamble of a first set of RACH preambles, wherein the first set of RACH preambles is for positioning purposes, a second set of RACH preambles is for non-critical communication purposes in a radio resource control (RRC) connected state, and a third set of RACH preambles is reserved for critical communication in the RRC connected state, and wherein a sum of the first set of RACH preambles, the second set of RACH preambles, and the third set of preambles is equal to 64;
at least one instruction instructing the TRP to receive, from a user equipment (UE), the at least one RACH preamble from the first set of RACH preambles; and
at least one instruction instructing the TRP to transmit, to the UE, in response to receiving the at least one RACH preamble, an allocation of one or more resources for transmission of uplink positioning signals for a positioning session involving the UE.

* * * * *